US006442135B1

(12) United States Patent
Ofek

(10) Patent No.: US 6,442,135 B1
(45) Date of Patent: Aug. 27, 2002

(54) MONITORING, POLICING AND BILLING FOR PACKET SWITCHING WITH A COMMON TIME REFERENCE

(75) Inventor: Yoram Ofek, Riverdale, NY (US)

(73) Assignee: Synchrodyne Networks, Inc.

(*) Notice: Subject to any disclaimer, the term of this patent is extended or adjusted under 35 U.S.C. 154(b) by 0 days.

(21) Appl. No.: 09/120,672

(22) Filed: Jul. 22, 1998

Related U.S. Application Data

(60) Provisional application No. 60/088,893, filed on Jun. 11, 1998.

(51) Int. Cl.[7] .............................................. H04L 12/56

(52) U.S. Cl. ..................... 370/229; 370/395.1; 370/401

(58) Field of Search .................................. 370/229, 236, 370/230, 231, 232, 233, 234, 235, 252, 253, 395.1, 397, 409, 414, 418, 465, 503, 509, 510, 401, 389

(56) References Cited

U.S. PATENT DOCUMENTS

| | | | | |
|---|---|---|---|---|
| 4,821,259 A | | 4/1989 | DeBruler et al. | 370/60 |
| 5,418,779 A | | 5/1995 | Yemini et al. | 370/54 |
| 5,442,636 A | | 8/1995 | Bontekoe | 370/108 |
| 5,455,701 A | | 10/1995 | Eng et al. | 359/135 |
| 5,623,483 A | | 4/1997 | Agrawal et al. | 370/253 |
| 6,038,230 A | * | 3/2000 | Ofek | 370/389 |
| 6,226,265 B1 | * | 5/2001 | Nakamichi | 370/235 |
| 6,240,514 B1 | * | 5/2001 | Inoue et al. | 713/153 |
| 6,246,701 B1 | * | 6/2001 | Slattery | 370/503 |

OTHER PUBLICATIONS

S.J.Golestani, "A Framing Strategy for Congestion Management", *IEEE Journal on Selected Areas in Communications*, vol. 9, No. 7, Sep. 1991, pp. 1064–1077.
Li et al., "Pseudo–isonchronous Cell Forwarding", *Computer Networks and ISDN Systems*, vol. 30 (1998), pp. 2359–2372.
Li et al., "'Time–driven Priority' Flow Control for Real–time Heterogeneous Internetworking", Proceedings of Infocom, vol. 15, Los Alamitos, CA, Mar. 1996, pp. 189–197.
Händel et al., "Signalling", *ATM Networks: Concepts, Protocols, and Applications*, (2nd Ed.) Addison–Wesley Publishing Co., 1994, Chapter 6, pp. 141–158.
Hennessy et al., "Enhancing Performance with Pipelining", *Computer Organization & Design: The Hardware/Software Interface*, Morgan Kaufman Publishers, San Mateo, CA, 1994, Chapter 6, pp. 364–389.

(List continued on next page.)

*Primary Examiner*—Dang Ton
*Assistant Examiner*—Brian Nguyen
(74) *Attorney, Agent, or Firm*—Sitrick & Sitrick

(57) ABSTRACT

This invention discloses a method for delay monitoring, policing and billing the data packet traffic in a packet switching network where the switches maintain a common time reference. This invention enables designated points inside the network to ascertain the level of packet traffic in predefine time intervals, and control the flow of packets and bring it back to predetermined levels in cases where the traffic volume exceeds predetermined levels. The information collected by the designated points facilitates billing for Internet services based on network usage, and identification of faulty conditions and malicious forwarding of packets that cause excessive delay beyond predetermined value.

53 Claims, 23 Drawing Sheets

OTHER PUBLICATIONS

C. Huitema, "Why is RIP So Simple?", *Routing In The Internet,* Prentice Hall, 1995, chapter 4, pp. 65–98.

IEEE 802.9a Editor. Integrated service (is): IEEE 802.9a "Isochronous Services With CSMA/CD MAC Service", IEEE Draft, Mar. 1995.

ITU–T, "Visual Telephone Systems and Equipment For Local Area Networks Which Provide A Non–Guaranteed Quality Of Service", ITU–T Recommendation H.323, 1996.

ITU–T, "Line Transmission Of Non–Telephone Signals: Control Protocol For Multimedia Communication", ITU–T Recommendation H.245, 1994.

Kandlur et al., "Real Time Communication In Multi–Hop Networks", *IEEE Transactions On Parallel and Distributed Systems,* vol. 5, No. 10, Oct. 1991, pp. 10441055.

M.G.H. Katevenis, "Fast Switching And Fair Control Of Congested Flow In Broadband Networks", *IEEE Journal on Selected Areas in Communications,* vol. SAC–5, No. 8, Oct. 1987, pp. 1315–1326.

J.Levine, "An Algorithm to Synchronize the Time of a Computer to Universal Time", *IEEE/ACM Transactions on Networking,* vol. 3, No. 1, Feb. 1995, pp 42–50.

Li et al., "Pseudo–Isonchronous Cell Switching In ATM Networks", IEEE INFOCOM'94, pp. 428–437, 1994.

D. Mills, "Improved Algorithms for Synchronizing Computer Network Clocks", *Computer Comm. Rev. (USA),* vol. 24, No. 4, Oct. 1994, pp 317–327.

D. Mills, "Internet Time Synchronization: The Network Time Protocol", *IEEE Transactions on Communications,* vol. 39, No. 10, Oct. 1981, pp. 4182–1493.

Y. Ofek, "Topology, Algorithms And Analysis Of A Synchronous Optical Hypergraph Architecture", Ph.D. Dissertation, Electrical Engineering Department, University of Illinois at Urbana, Report No. UIUCDCS–R–87–1343, May 1987.

Y. Ofek, "Integration Of Voice Communication On A Synchronous Optical Hypergraph", INFOCOM'88, May 1988.

Y. Ofek, "Generating A Fault Tolerant Global Clock Using High–Speed Control Signals For The MetaNet Architecture", *IEEE Transactions on Communications,* pp. 2179–2188, May 1994.

Y.Ofek, "The Conservation Code for Bit Synchronization", *IEEE Transactions on Communications,* vol. 38, No. 7, Jul. 1990, pp. 1107–1113.

Ofek et al., "'Time–Driven Priority' Flow Control For Real–Time Heterogeneous Internetworking", IEEE INFOCOM'96, 1996.

Parekh et al., "A Generalized Processor Sharing Approach To Flow Control In Integrated Services Networks: The Multiple Node Case", *IEEE Transactions on Networking,* vol. 2, No. 2, Apr. 1994, pp. 137–150.

Patterson et al., "Pipelining", *Computer Architecture: A Quantitative Approach,* Morgan Kaufman Publishers, San Mateo, CA, 1990, Chapter 6, pp. 251–278.

T. Piotrowski, "Synchronization Of Telecommunication Network Using A Global Positioning Satellite", Abstract, IEEE PLANS'92, Mar. 1992.

D.Robinson, "Internet Stratum One GPS Network Time Server: A Commercial Embodiment", Datum Corporation.

Rosen et al., "A Proposed Architecture For MPLS" <draft–ietf–mpls–arch–00.txt> Internet Draft, Aug. 1997.

Schultzrinne et. al, "RTP: A Transport Protocol for Real–Time Applications, IETF Request for Comment RFC1889", Jan. 1996.

M. Schwartz, "Networking Layer: Routing Function", *Telecommunication Networks: Protocols, Modeling, and Analysis,* Addison Wesley, Reading MA, 1987, Chapter 6, pp. 259–330.

Shenker et al., "Specification of Guaranteed Quality of Service, IETF Request for Comment RFC2212", Sep. 1997.

W. Stallings, "Overview", *SNMP, SNMPv2, and CMIP: The Practical Guide To Network Management,* Addison Wesley, 1993, Chapter 1, pp. 1–14.

A. Tannebaum, "Routing Algorithms", *Computer Networks,* (3rd Ed) Prentice Hall, 1996, Chapter 5.2, pp. 345–374.

C. Topolcic (Ed.) Experimental Internet Stream Protocol, Version 2 (ST–II), RFC 1190, Oct. 1990.

J. Wroclawski, "Specification of the Controlled–Load Network Element Service", IETF RFC 2211, Sep. 1997.

D. Mills, "Network Time Protocol (Version 3) Specification, Implementation and Analysis", Network Working Group, RFC 1305, University of Delaware, Mar. 1992.

* cited by examiner

4B/5B encoding scheme

| HEX DATA | 4-bit Binary Data | 5-bit Encoded Data Codeword |
|---|---|---|
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

FIG. 10

4B/5B encoding scheme

| HEX DATA | Control Input Binary Data | 10-bit Encoded Control Codeword |
|---|---|---|
| 1 | 0001 | 11111 11111 |
| 2 | 0010 | 01101 01101 |
| 3 | 0011 | 01101 11001 |
| 4 | 0100 | 11111 00100 |
| 5 | 0101 | 01101 00111 |
| 6 | 0110 | 11001 00111 |
| 7 | 0111 | 11001 11001 |
| 8 | 1000 | 00100 00100 |
| 9 | 1001 | 00100 11111 |
| A | 1010 | 00100 00000 |
| B | 1011 | 00111 00111 |
| C | 1100 | 00111 11001 |
| D | 1101 | 00000 00100 |
| E | 1110 | 00000 11111 |
| F | 1111 | 00000 00000 |

FIG. 11

MONITORING, POLICING AND BILLING FOR PACKET SWITCHING WITH A COMMON TIME REFERENCE

RELATED APPLICATIONS

This application is provisional application serial No. 60/088,893 filed Jun. 11, 1998.

BACKGROUND OF THE INVENTION

This invention relates generally to a method and apparatus for monitoring, policing and billing of the transmission of data packet on a communications network. More specifically, this invention provides the monitoring, policing and billing in networks with timely forwarding and delivery of data packets to their destination nodes. Consequently, the end-to-end performance parameters, such as, loss, delay and jitter, are predictable, and therefore, it is possible to measure them. Consequently, such measurements are used in the monitoring, policing and billing.

The proliferation of high-speed communications links, fast processors, and affordable, multimedia-ready personal computers brings about the need for wide area networks that can carry real time data, like telephony and video. However, the end-to-end transport requirements and the ability to measure the actual performance of real-time multimedia applications present a major challenge that cannot be solved satisfactorily by current a synchronous networking technologies.

Monitoring, policing and billing are possible today only over circuit-switching networks, which are still the main carrier for real-time traffic, are designed for telephony service and cannot be easily enhanced to support multiple services or carry multimedia traffic. Its synchronous byte switching enables circuit-switching networks to transport data streams at constant rates with little delay or jitter. However, since circuit-switching networks allocate resources exclusively for individual connections, they suffer from low utilization under bursty traffic. Moreover, it is difficult to dynamically allocate circuits of widely different capacities, which makes it a challenge to support multimedia traffic. Finally, the synchronous byte switching of SONET, which embodies the Synchronous Digital Hierarchy (SDH), requires increasingly more precise clock synchronization as the lines speed increases [Balla et al., "SONET: Now It's The Standard Optical Network", IEEE Communications Magazine, Vol. 29 No. 3, March 1989, pages 8–15] [M. Schwartz, "Telecommunication Networks: Protocols, Modeling, and Analysis", Addison Wesley, Reading Mass., 1987].

Packet switching networks like IP (Internet Protocol)-based Internet and Intranets [see, for example, A.Tannebaum, "Computer Networks" (3rd Ed) Prentice Hall, 1996] are not designed for doing monitoring, policing and billing.

In order to facilitate the capability for monitoring, policing and billing some enhancements were proposed for P networks. Such methods for providing different services under packet switching fall under the general title of Quality of Service (QoS). Prior art in QoS can be divided into two parts: (1) traffic shaping with local timing without deadline scheduling, for example [M. G. H. Katevenis, "Fast Switching And Fair Control Of Congested Flow In Broadband Networks", IEEE Journal on Selected Areas in Communications, SAC-5(8):1315–1326, Oct. 1987; Demers et al., "Analysis and Simulation Of A Fair Queuing Algorithm", ACM Computer Communication Review (SIGCOMM'89), pages 3–12, 1989; S. J. Golestani, "Congestion-Free Communication In High-Speed Packet Networks", IEEE Transcripts on Communications, COM-39(12):1802–1812, December 1991; Parekh et al., "A Generalized Processor Sharing Approach To Flow Control—The Multiple Node Case", IEEEIACM T. on Networking, 2(2): 137–150, 1994], and (2) traffic shaping with deadline scheduling, for example [Ferrari et al., "A Scheme For Real-Time Channel Establishment In Wide-Area Networks", IEEE Journal on Selected Areas in Communication, SAC-8(4):368–379, Apr. 1990; Kandlur et al., "Real Time Communication In Multi-Hop Networks", IEEE Trans. on Parallel and Distributed Systems, Vol. 5, No. 10, pp. 1044–1056, 1994]. Both of these approaches rely on manipulation of local queues by each router with little coordination with other routers. The Weighted Fair Queuing (WFQ), which typifies these approaches, is based on cyclical servicing of the output port queues where the service level of a specific class of packets is determined by the amount of time its queue is served each cycle [Demers et al., "Analysis and Simulation Of A Fair Queuing Algorithm", ACM Computer Communication Review (SIGCOMM'89), pages 3–12, 1989]. These approaches have inherent limitations when used to transport real-time streams. When traffic shaping without deadline scheduling is configured to operate at high utilization with no loss, the delay and jitter are inversely proportional to the connection bandwidth, which means that low rate connections may experience large delay and jitter inside the network. In traffic shaping with deadline scheduling the delay and jitter are controlled at the expense of possible congestion and loss.

The real-time transport protocol (RTP) [H. Schultzrinne et. al, RTP: A Transport Protocol for Real-Time Applications, IETF Request for Comment RFC1889, January 1996] is a method for encapsulating time-sensitive data packets and attaching to the data time related information like time stamps and packet sequence number. RTP is currenty the accepted method for transporting real time streams over IP intemetworks and packet audio/video telephony based on ITU-T H.323.

One approach to an optical network that uses synchronization was introduced in the synchronous optical hypergraph [Y. Ofek, "The Topology, Algorithms And Analysis Of A Synchronous Optical Hypergraph Architecture", Ph.D. Dissertation, Electrical Engineering Department, University of Illinois at Urbana, Report No. UIUCDCS-R-87-1343, May 1987], which also relates to how to integrate packet telephony using synchronization [Y. Ofek, "Integration Of Voice Communication On A Synchronous Optical Hypergraph", INFOCOM'88, 1988]. In the synchronous optical hypergraph, the forwarding is performed over hyper-edges, which are passive optical stars. In [Li et al., "Pseudo-Isochronous Cell Switching In ATM Networks", IEEE INFOCOM'94, pages 428–437, 1994; Li et al., "Time-Driven Priority: Flow Control For Real-Time Heterogeneous Internetworking", IEEE INFOCOM'96, 1996] the synchronous optical hypergraph idea was applied to networks with an arbitrary topology and with point-to-point links. The two papers [Li et al., "Pseudo-Isochronous Cell Switching In ATM Networks", IEEE INFOCOM'94, pages 428–437, 1994; Li et al., "Time-Driven Priority: Flow Control For Real-Time Heterogeneous Internetworking", IEEE INFOCOM'96, 1996] provide an abstract (high level) description of what is called "RISC-like forwarding", in which a packet is forwarded, with little if any details, one hop every time frame in a manner similar to the execution of instructions in a Reduced Instruction Set Computer (RISC) machine [Patterson et al., "Computer Architecture: A Quantitative Approach", Morgan Kaufman Publishers, San Francisco, 1990].

In U.S. Pat. No. 5,455,701, Eng et al. discloses an apparatus for controlling a high-speed optical switching system with pipeline controller for switch control. In U.S. Pat. No. 5,418,779 Yemini et al. disclose a switched network architecture with common time reference. The time reference is used in order to determine the time in which multiplicity of nodes can transmit simultaneously over one predefined routing tree to one destination. At every time instance the multiplicity of nodes are transmitting to different single destination node.

SUMMARY OF THE INVENTION

This invention discloses a method for monitoring and policing the packet traffic in a packet switching network where the switches maintain a common time reference.

This invention enables designated points inside the network to ascertain the level of packet traffic in predefine time intervals, and control the flow of packets and bring it back to predetermined levels in cases where the traffic volume exceeds predetermined levels.

The information collected by the designated points facilitates billing for Internet services based on network usage, and identification of faulty conditions and malicious forwarding of packets that cause excessive delay beyond predetermined value.

In accordance with the present invention, a method is disclosed providing virtal pipes that carry real-time traffic over packet switching networks while guaranteeing end-to-end performance. The method combines the advantages of both circuit and packet switching. It provides for allocation for the exclusive use of predefined connections and for those connections it guarantees loss free transport with low delay and jitter. When predefined connections do not use their allocated resources, other non-reserved data packets can use them without affecting the performance of the predefined connections. On the Internet the non-reserved data packet traffic is called "best effort" traffic. In accordance with the present invention, the bandwidth allocated to a connection and the delay and jitter inside the network are independent. MPLS can be used by the present invention to identify virtual pipes. The packet time-stamp that is carried in the RTP header can be used in accordance with the present invention to facilitate time-based transport Under the aforementioned prior art methods for providing packet switching services, switches and routers operate asynchronously. The present invention provides real-time services by synchronous methods that utilize a time reference that is common to the switches and end stations comprising a wide area network The common time reference can be realized by using UTC (Coordinated Universal Time), which is globally available via, for example, GPS (Global Positioning System—see, for example: http://www.utexas.eduldeptstgrg/gcraftfnotestgps/gps.html). By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) (see http:www.boulder.nist.gov/timefreq) is responsible for coordinating with the International Bureau of Weights and Measures (BIPM) in Paris in maintaining UTC.

UTC timing is readily available to individual PCs through GPS cards. For example, TrueTime, Inc.'s (Santa Rosa, Calif.) PCI-SG provides precise time, with zero latency, to computers that have PCI extension slots. Another way by which UTC can be provided over a network is by using the Network Time Protocol (NTP) [D. Mills, "Network Time Protocor" (version 3) IETF RFC 1305]. However, the clock accuracy of NTP is not adequate for interswitch coordination, on which this invention is based.

In accordance with the present invention, the use of reserved resources is allowed by all packet traffic whenever the reserved resources are not in use.

A key difference between the synchronous optical hypergraph and the present invention is the forwarding of packets over simple point-to-point edges in this invention. The pipeline in accordance with the present invention is used for the forwarding of packets inside the network, not for switch control as in the Eng et al. patent Although the present invention relies on time to control the flow of packets inside the network in a similar fashion as in circuit switching, there are major differences between the two approaches. In circuit switching, for each data unit (e.g., a byte) at the time it has been transmitted from its source, it is possible to predict deterministically the future times it will be transmitted from any switch along its route [Balart et al., "SONET: Now It's The Standard Optical Network", IEEE Communications Magazine, Vol. 29 No. 3, March 1989, pages 8–15]. The time resolution of this advanced knowledge is much shorter than the data unit transmission time. On the other hand, in accordance with the present invention, for each data unit (e.g., a cell) at the time it has been transmitted from its source, it is possible to know the future time frames that this data unit will be forwarded along its route. However, the time frame, which constitutes the accuracy of this advance timing knowledge, is much larger than one data unit transmission time. For example, the transmission time of an ATM cell (53 bytes) over a gigabit per second link is 424 nanoseconds, which is 294 times smaller than a typical time frame of 125 microseconds—used in one embodiment of the present invention. There are several consequences that further distinguish the present invention from circuit switching:

In accordance with the present invention, the synchronization requirements are independent of the physical link transmission speed, while in circuit switching the synchronization becomes more and more difficult as the link speed increases.

In accordance with the present invention, timing information is not used for routing, and therefore, in the Internet, for example, the routing is done using IP addresses or a tag/label.

In accordance with the present invention, the Internet "best effort" packet forwarding strategy can be integrated into the system.

These and other aspects and attributes of the present invention will be discussed with reference to the following drawings and accompanying specification.

BRIEF DESCRIPTION OF THE DRAWINGS:

FIG. 10 is a table of the 4B/5B encoding scheme for data such as is used by the AM7968—TAXI chip set in accordance with one embodiment of the present invention;

FIG. 11 is a table of the 4B/5B encoding scheme for control signals, such as, the time frame delimiter (TFD) such as is used by the AM7968, in accordance with one embodiment of the present invention;

FIGS. 15A and 15B illustrate two generic data packet headers with virtual pipe ID (PID), and priority bit (P), wherein FIG. 15A illustrates a packet without time-stamp field, and wherein FIG. 15B illustrates a packet with time-stamp field, and also shows how the common time-reference value, time of arrival (TOA), is attached by the routing controller;

DETAILED DESCRIPTION OF THE PREFERRED EMBODIMENT

Figure 1:
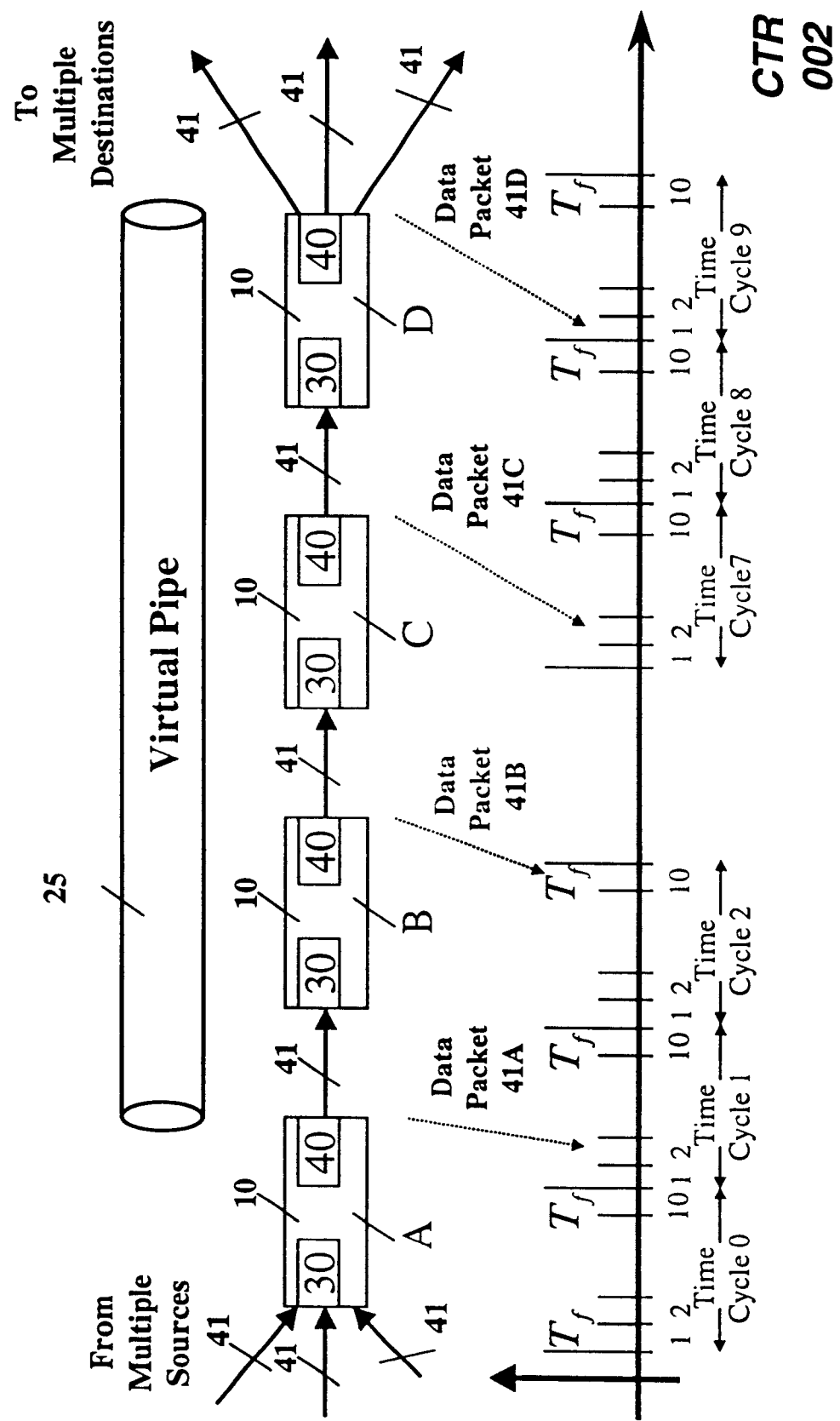
FIG. 1 is a schematic illustration of a virtual pipe and its timing relationship with a common time reference (CTR), wherein delay is determined by the number of time frames between the forward time out at Node A and the forward time out at Node D.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

The present invention relates to a system and method for monitoring, policing and billing of the transmission and forwarding of data packets over a packet switching network. The switches of the network maintain a common time reference, which is obtained either from an external source (such as GPS—Global Positioning System) or is generated and distributed internally. The time intervals are arranged in simple periodicity and complex periodicity (like seconds and minutes of a clock). A packet that arrives to an input port of a switch, is switched to an output port based on specific routing information in the packet's header (e.g., IPv4 destination address in the Internet, VCI,VPI labels in ATM). Each switch along a route from a source to a destination forwards packets in periodic time intervals that are predefined using the common time reference. The time interval duration can be longer than the time duration required for transmitting a packet, in which case the exact position of a packet in the time interval is not predetermined.

Packets that are forwarded inside the network over the same route and in the same periodic time intervals constitute a virtual pipe and share the same PID. PID can be either explicit, such as a tag or a label that is generated inside the network, or implicit such as a group of IP addresses. A virtual pipe can be used to transport data packets from multiple sources and to multiple destinations. A virtual pipe provides deterministic quality of service guarantees. The time interval in which a switch forwards a specific packet is determined by the packet's PID, the time it reaches the switch, and the current value of the common time reference. In accordance with the present invention, congestion-free packet switching is provided for PIDs in which capacity in their corresponding forwarding links and time intervals is reserved in advance. Furthermore, packets that are transferred over a virtual pipe reach their destination in predefined time intervals, which guarantees that the delay jitter is smaller than or equal to one time interval.

Packets that are forwarded from one source to multiple destinations share the same pipe ID and the links and time intervals on which they are forwarded comprise a virtual tree. This facilitates congestion-free forwarding from one input port to multiple output ports, and consequently, from one source to multiplicity of destinations. Packets that are destined to multiple destinations reach all of their destinations in predefined time intervals and with delay jitter that is no larger than one time interval.

A system is provided for managing data transfer of data packets from a source to a destination. The transfer of the data packets is provided during a predefined time interval, comprised of a plurality of predefined time frames. The system is further comprised of a plurality of switches. A virtual pipe is comprised of at least two of the switches interconnected via communication links in a path. A common time reference signal is coupled to each of the switches, and a time assignment controller assigns selected predefined time frames for transfer into and out from each of the respective switches responsive to the common time reference signal. For each switch, there is a first predefined time frame within which a respective data packet is transferred into the respective switch, and a second predefined time frame within which the respective data packet is forwarded out of the respective switch. The time assignment provides consistent fixed intervals between the time between the input to and output from the virtual pipe.

In a preferred embodiment, there is a predefined subset of the predefined time frames during which the data packets are transferred in the switch, and for each of the respective switches, there are a predefined subset of the predefined time frames during which the data packets are transferred out of the switch.

Each of the switches is comprised of one or a plurality of addressable input and output ports. A routing controller maps each of the data packets that arrives at each one of the input ports of the respective switch to a respective one or more of the output ports of the respective switch.

For each of the data packets, there is an associated time of arrival to a respective one of the input ports. The time of arrival is associated with a particular one of the predefined time frames. For each of the mappings by the routing controller, there is an associated mapping by a scheduling controller, which maps of each of the data packets between the time of arrival and forwarding time out. The forwarding time out is associated with a specified predefined time frame.

In the preferred embodiment, there are a plurality of the virtual pipes comprised of at least two of the switches interconnected via communication links in a path. The communication link is a connection between two adjacent switches; and each of the communications links can be used simultaneously by at least two of the virtual pipes. Multiple data packets can be transferred utilizing at least two of the virtual pipes.

There is a fixed time difference, which is constant for all switches, between the time frames for the associated time of arrival and forwarding time out for each of the data packets. The fixed time difference is a variable time difference for some of the switches. A predefined interval is comprised of a fixed number of contiguous time frames comprising a time cycle. Data packets that are forwarded over a given virtual pipe are forwarded from an output port within a predefined subset of time frames in each time cycle. Furthermore, the number of data packets that can be forwarded in each of the predefined subset of time frames for a given virtual pipe is also predefined.

The time frames associated with a particular one of the switches within the virtual pipe are associated with the same switch for all the time cycles, and are also associated with one of input into or output from the particular respective switch.

There is a constant fixed time between the input into and output from a respective one of the switches for each of the time frames within each of the time cycles. A fixed number of contiguous time cycles comprise a super cycle, which is periodic. Data packets that are forwarded over a given virtual pipe are forwarded from an output port within a predefined subset of time frames in each super cycle. Furthermore, the number of data packets that can be forwarded in each of the predefined subset of time frames within a super cycle for a given virtual pipe is also predefined.

In the preferred embodiment the common time reference signal is coupled from a GPS (Global Positioning System), and is in accordance with the UTC (Coordinated Universal Time) standard. The UTC time signal does not have to be received directly from GPS, such signal can be received by using various means, as long as the delay or time uncertainty associated with that UTC time signal does not exceed half a time frame.

In one embodiment, the super cycle duration is equal to one second as measured using the UTC (Coordinated Universal Time) standard. The super cycle can also be equal to multiple UTC seconds or a fraction of a UTC second.

A select buffer controller maps one of the time frames for output from a first switch to a second time frame for input via the communications link to a second switch. The select buffer controller uses the UTC time signal in order to identify the boundaries between two successive time frames. The select buffer controller insert a time frame delimiter (IGD) signal into the transmission link in order to the signal the second switch the exact boundary between two time frames.

Each of the data packets is encoded as a stream of data, and a time frame delimiter is inserted into the stream of data responsive to the select buffer controller. This can be implemented by using a redundant serial codewords as it is later explained.

The communication links can be of fiber optic, copper, and wireless communication links for example, between a ground station and a satellite, and between two satellites orbiting the earth The communication link between two nodes does not have to be a serial communication link. A parallel communication link can be used—such link can carry simultaneously multiple data bits, associated clock signal, and associated control signals.

The data packets can be Internet protocol (IP) data packets, and asynchronous transfer mode (ATM) cells, and can be forwarded over the same virtual pipe having an associated pipe identification (PID). The PID can be an Internet protocol (IP) address, Internet protocol group multicast address, an asynchronous transfer mode (ATM), a virtual circuit identifier (VCI), and a virtual path identifier (VPI), or (used in combination as VCI(VPI).

The routing controller determines two possible associations of an incoming data packet: (i) the output port, and (ii) the time of arrival (TOA). The TOA is then used by the scheduling controller for determining when a data packet should be forwarded by the select buffer controller to the next switch in the virtual pipe. The routing controller utilizes at least one of Internet protocol version 4 (IPv4), Internet protocol version 6 (IPv6) addresses, Internet protocol group multicast address, Internet MPLS (multi protocol label swapping or tag switching) labels, ATM virtual circuit identifier and virtual path identifier (VCI/VPI), and IEEE 802 MAC (media access control) addresses, for mapping from an input port to an output port.

Each of the data packets is comprised of a header, which includes an associated time stamp. For each of the mappings by the routing controller, there is an associated mapping by the scheduling controller, of each of the data packets between the respective associated time-stamp and an associated forwarding time out, which is associated with one of the predefined time frames. The time stamp can record the time in which a packet was created by its application.

In one embodiment the time-stamp is generated by an Internet real-time protocol (RTP), and by a predefined one of the switches. The time-stamp can be used by a scheduling controller in order to determine the forwarding time of a data packet from an output port.

Each of the data packets originates from an end station, and the time-stamp is generated at the respective end station for inclusion in the respective originated data packet. Such generation of a time-stamp can be derived from UTC either by receiving it directly from GPS or by using the Internet's Network Time Protocol (NTP).

The following description illustrates a preferred embodiment and implementation of the system disclosed in accordance with the present invention. In FIGS. 1–8, the principles of operation and implementation are presented and discussed. In FIGS. 9–23, the details of one embodiment's design are given.

In accordance with the present invention, a system is provided for transferring data packets across a data network while maintaining for reserved data traffic constant bounded jitter (or delay uncertainty) and no congestion-induced loss of data packets. Such properties are essential for many multimedia applications, such as, telephony and video teleconferencing.

Figure 2:
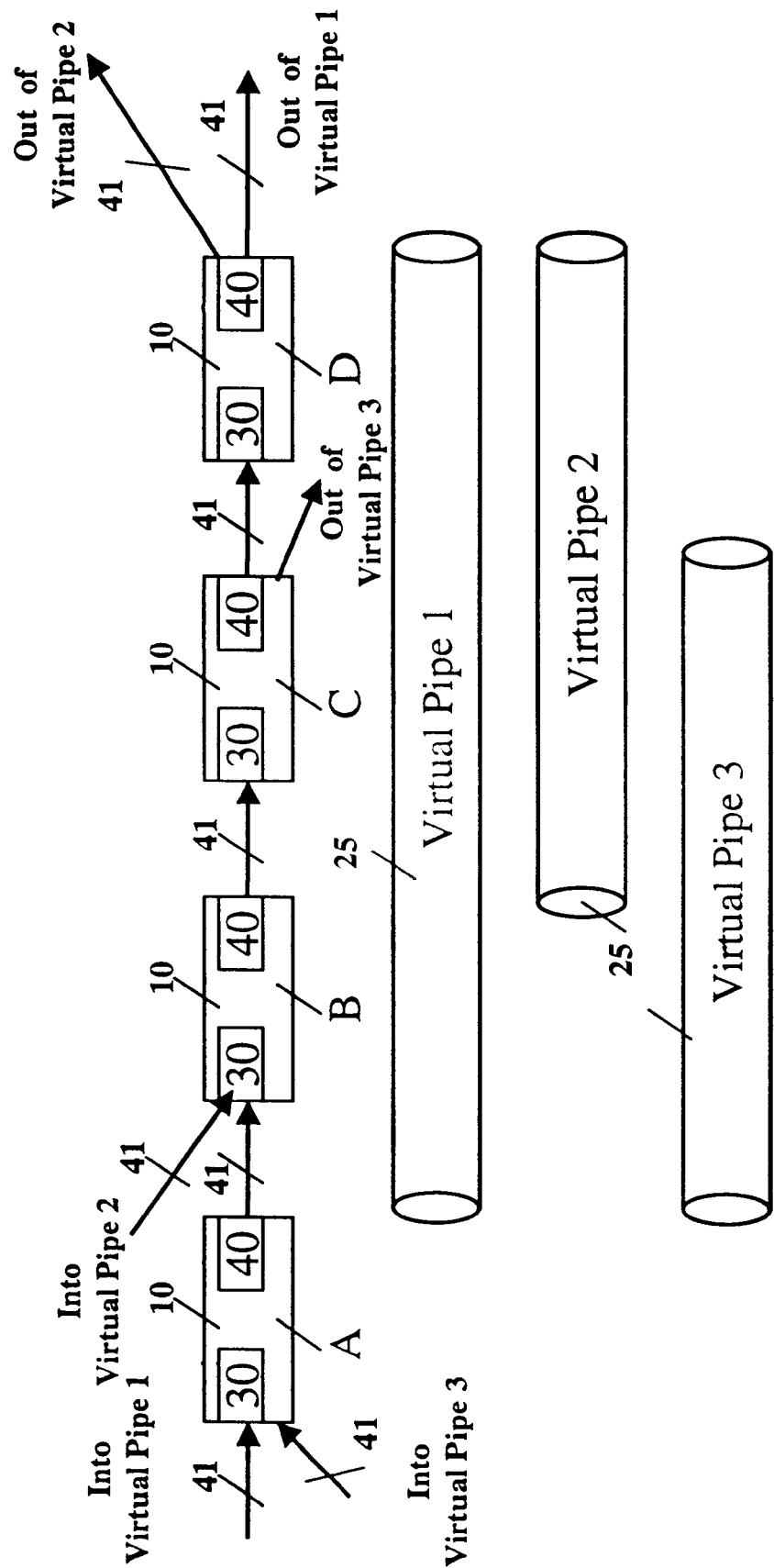
FIG. 2 is a schematic illustration of multiple virtual pipes sharing certain ones of the switches.

In accordance with the design, method, and illustrated implementation of the present invention, one or a plurality of virtual pipes 25 are provided, as shown in FIG. 1 and FIG. 2, over a data network with general topology. Such data network can span the globe. Each virtual pipe 25 is constructed over one or more switches 10, shown in FIG. 1, which are interconnected via communication links 41 in a path.

FIG. 1 illustrates a virtual pipe 25 from the output port 40 of switch A, through switches B and C. This virtual pipe ends at the output port 40 of node D. The virtual pipe 25 transfers data packets from at least one source to at least one destination.

FIG. 2 illustrates three virtual pipes: virtual pipe 1 from the output of switch A to the output of switch D, virtual pipe 2 from the output of switch B to the output of switch D, and virtual pipe 3 from the output of switch A to the output of switch C.

The data packet transfers over the virtual pipe 25 via switches 10 are designed to occur during a plurality of predefined time intervals, wherein each of the predefined time intervals is comprised of a plurality of predefined time frames. The timely transfers of data packets are achieved by coupling a common time reference 002 (CTR) signal to each of the switches 10.

Figure 3:
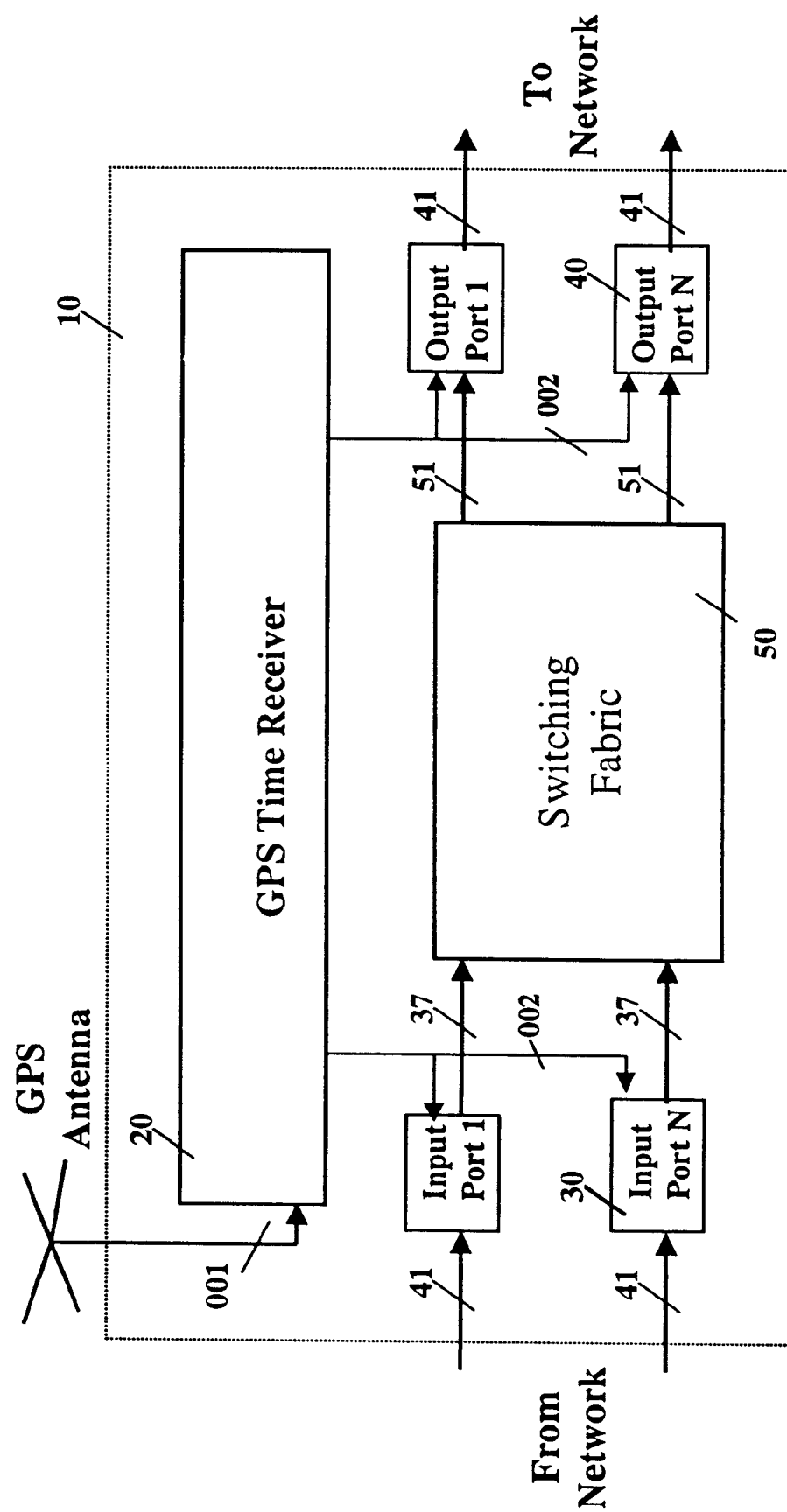
FIG. 3 is a schematic block diagram illustration of a switch that uses a common time reference from the GPS (Global Positioning System) for the timely forwarding of packets disclosed in accordance with the present invention.

FIG. 3 illustrates the structure of a pipeline switch 10. The switch 10 is comprised of one or a plurality of input ports 30, one or a plurality of output ports 40, switching fabric 50, and global positioning system (GPS) time receiver 20 with a GPS antenna 001. The GPS time receiver provides a common time reference signal (CTR) 002 to all input and output ports.

Figure 4:
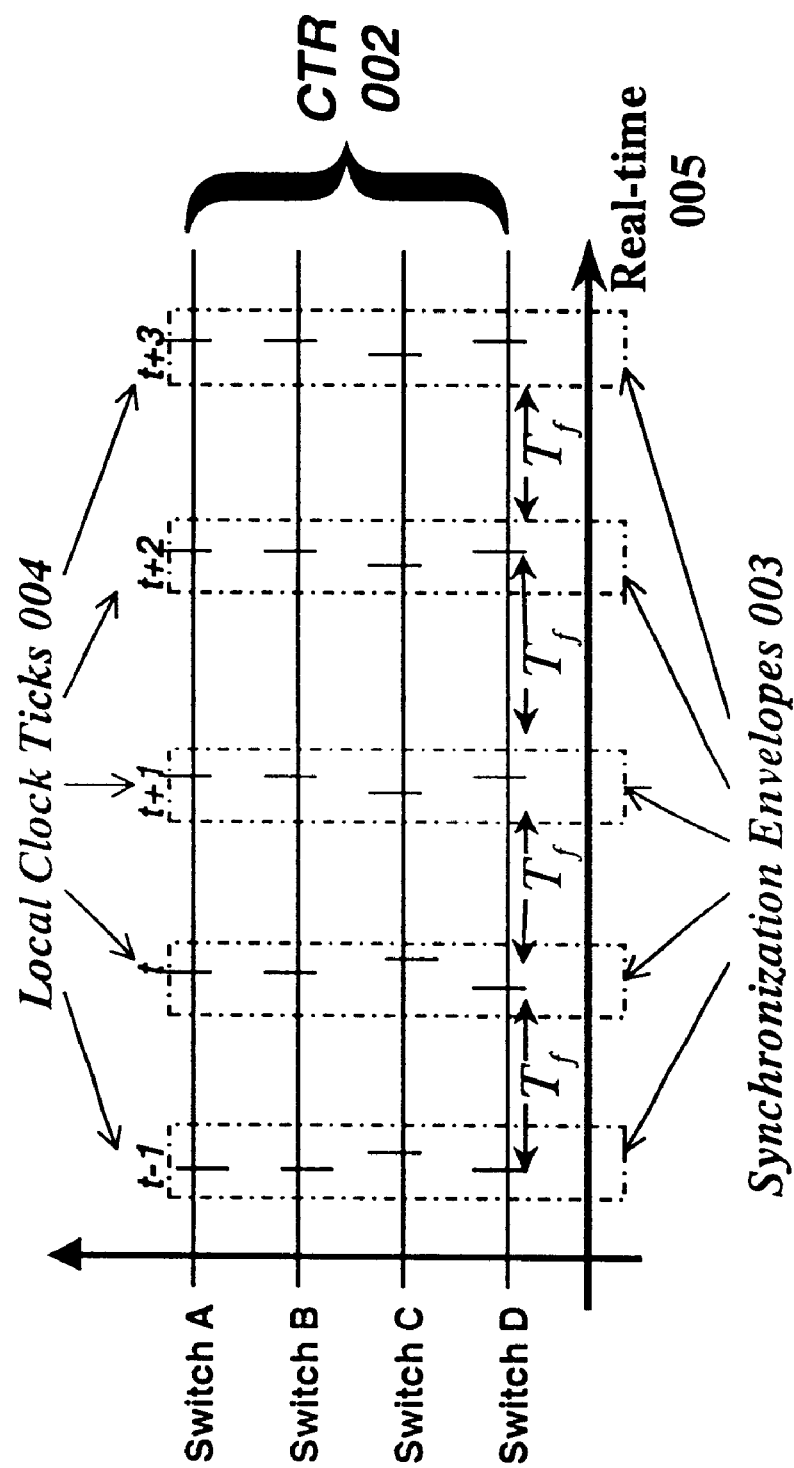
FIG. 4 illustrates the relationship among the local common time reference (CTR) on the switches, and how the multiplicity of local times is projected on the real-time axis, wherein time is divided into time frames of a predefined duration.

The Common Time Reference (CTR) 002:

As shown in FIG. 4, the common time reference 002 that is coupled to the switches 10 provides the following property: the local clock ticks 004, shown in FIG. 4, at all the pipeline switches (e.g., switches A, B, C, and D in FIGS. 1 and 2) when projected on the real-time axis 005 will all occur within predefined synchronization envelopes 003. In other words, the local clock ticks 004 occur within the synchronization envelopes 003, and therefore, outside to the synchronization envelopes all local clocks have the same clock value.

The common time reference is divided in a predefined manner into time frames, Tf, of equal duration, as shown in FIG. 4, typically Tf=125 microseconds. The time frames are grouped into time cycles. Each time cycle has a predefined number of time frames.

Figure 5:
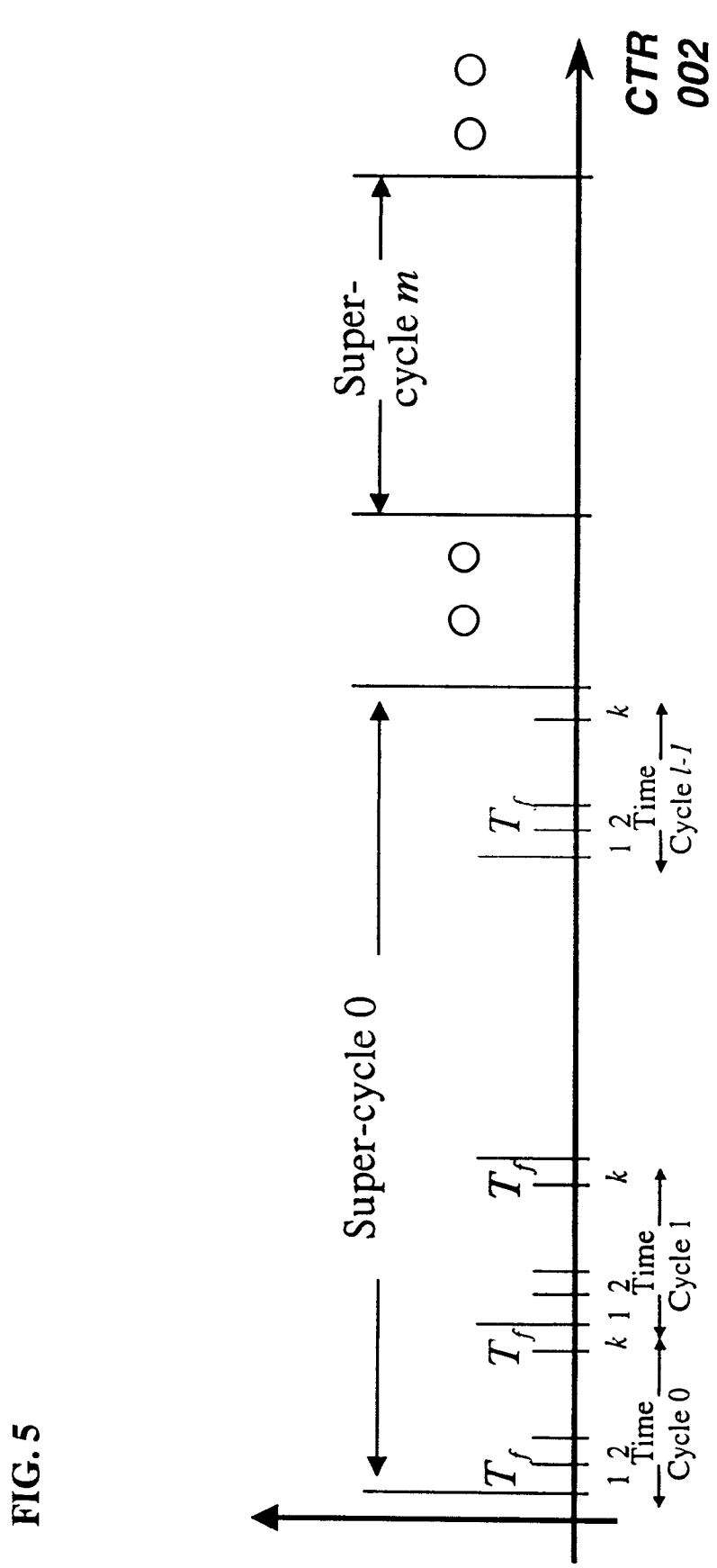
FIG. 5 is a schematic illustration of how the common time reference is organized into contiguous time-cycles of k time-frames each and contiguous super-cycle of l time-cycles each.

Referring to FIG. 5, there are k time frames in each time cycle. Contiguous time cycles are grouped together into contiguous super cycles, and as shown in FIG. 5, there are l time cycles in each super cycle.

Figure 6:
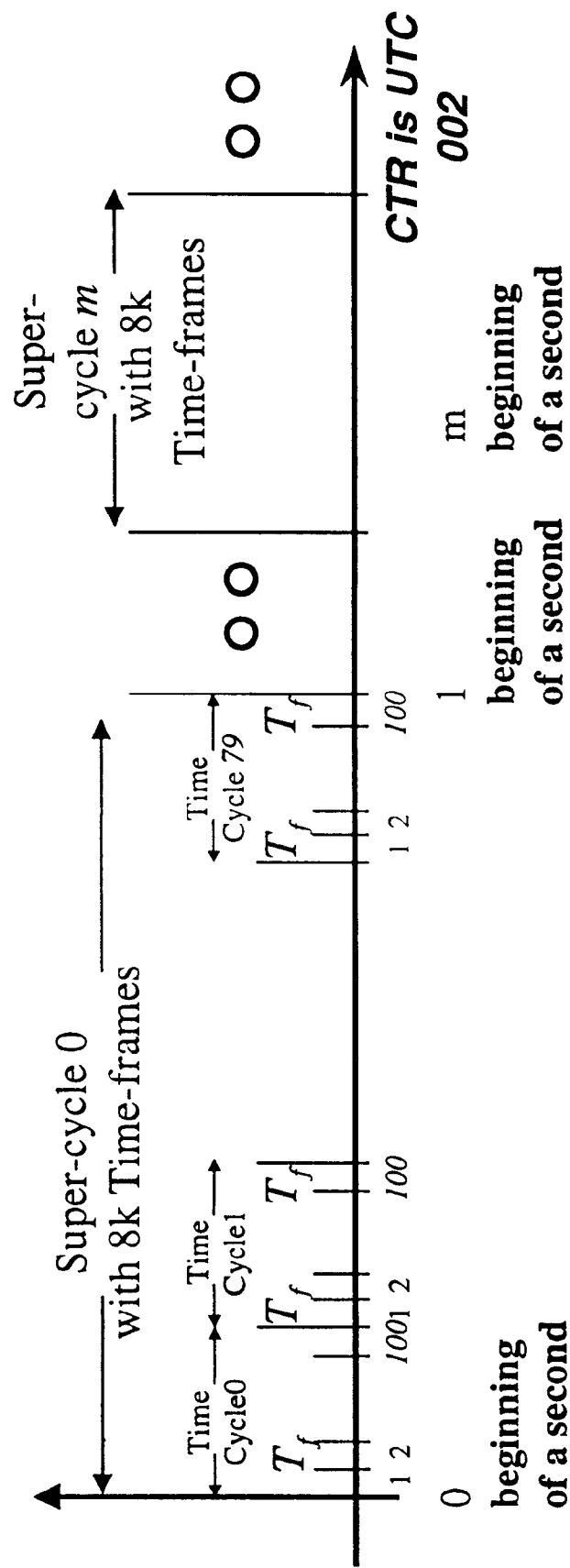
FIG. 6 is a schematic illustration of the relationship of the network common time reference and UTC (Coordinated Universal Time), such that, each time-cycle has 100 time-frames, of 125 microseconds each, and 80 time-cycles are grouped into one super-cycle of one second.

FIG. 6 illustrates how the common time reference can be aligned with the UTC (Coordinated Universal Time) standard. In this illustrated example, every duration of every super cycle is exactly one second as measured by UTC. Moreover, the beginning of each super cycle coincides with the beginning of a UTC second, as shown in FIG. 6. Consequently, when leap seconds are inserted or deleted for UTC corrections (due to changes in the earth rotation period) the cycle and super cycle periodic scheduling will not be affected.

The time frames, time cycles, and super cycles are associated in the same manner with all respective switches within the virtual pipe at all times.

Pipeline Forwarding:

Pipeline forwarding relates to data packets being forwarded across a virtual pipe 25 with a predefined delay in every stage (either across a communication link 41 or across a switch 10 from input port 30 to output port 40). Data packets enter a virtual pipe 25 from one or more sources and forwarded to one or more destinations.

Figure 7:
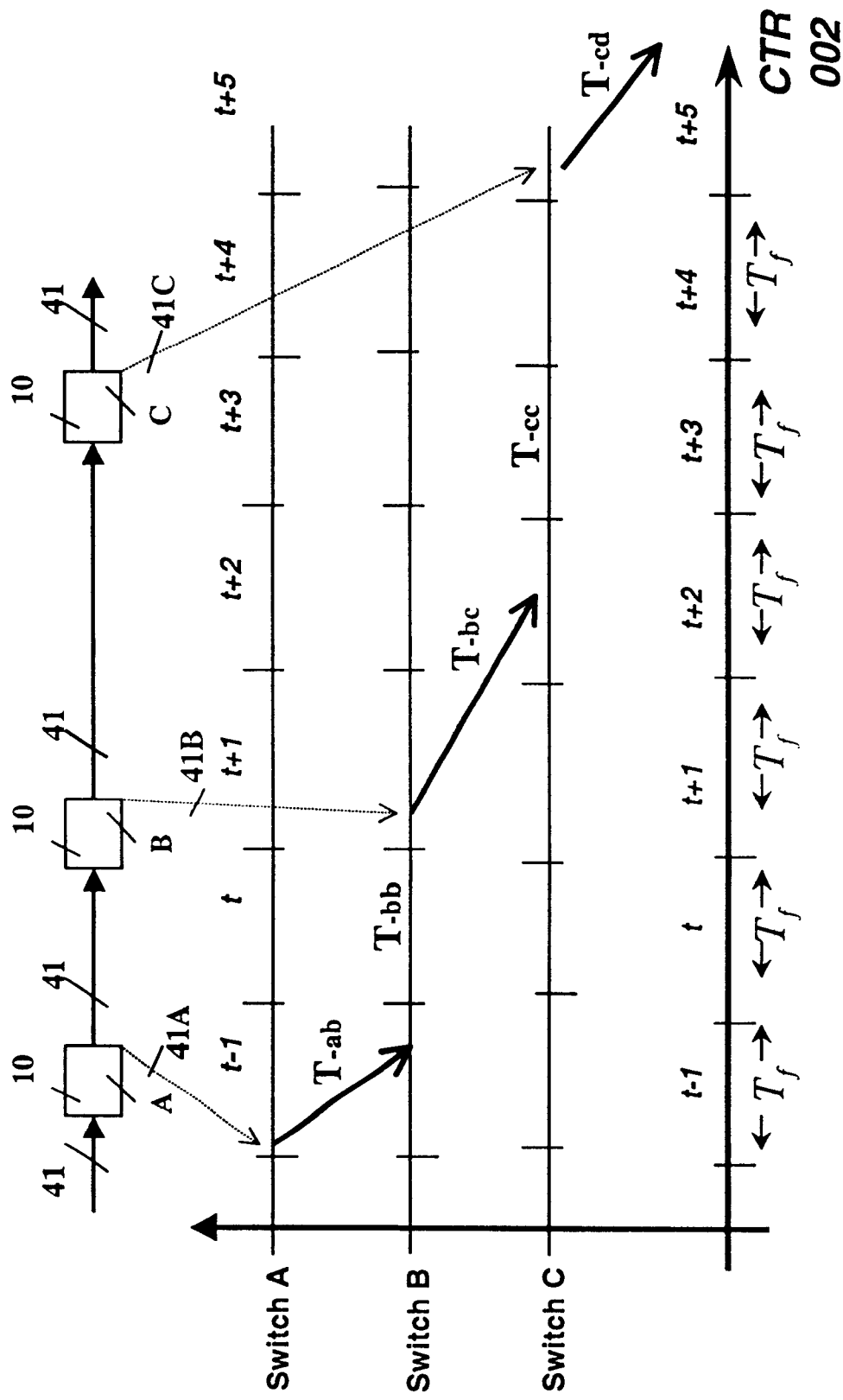
FIG. 7 is a schematic illustration of a data packet pipeline as in FIG. 1, and correlating to data packet movement through the switches 10 versus time for forwarding over a virtual pipe with common time reference (CIR)

This sort of pipeline forwarding used in accordance with the present invention is illustrated in FIG. 7. Data packet 41A is forwarded out of switch A during time frame t−1. This data packet 41A will reach switch B after a delay of T−ab. This data packet 41A will be forwarded out of switch B as data packet 41B during time frame t+1 and will reach switch C after a delay of T−bc. This data packet 41B will be forwarded out of switch C as data packet 41C during time frame t+5. Data packet 41C will reach switch D after a delay of T−cd. Consequently, the delay from the output of switch A to the output of switch C is 6=t+5−(t−1) time frames. As illustrated in FIG. 7, all data packets that are forwarded over that virtual pipe will have a delay of six time frames from the output of switch A to the output of switch C.

Referring again to FIG. 1, the timely pipeline forwarding of data packets over the virtual pipe 25 is illustrated. A data packet is received by one of the input ports 30 of switch A at time frame 1, and is forwarded along this virtual pipe 25 in the following manner: (i) the data packet 41A is forwarded from the output port 40 of switch A at time frame 2 of time cycle 1, (ii) the data packet 41B is forwarded from the output port 40 of switch B, after 18 time frames, at time frame 10 of time cycle 2, (iii) the data packet 41C is forwarded from the output port 40 of switch C, after 42 time frames, at time frame 2 of time cycle 7, and (iv) the data packet 41D is forwarded from the output port 40 of switch D, after 19 time frames, at time frame 1 of time cycle 9.

As illustrated in FIG. 1,

All data packets enter the virtual pipe 25 (i.e., forwarded out of the output port 40 of switch A) periodically at the second time frame of a time cycle, are output from this virtual pipe 25 (i.e., are forwarded out of the output port 40 of switch D) after 79 time frames.

The data packets that enter the virtual pipe 25 (i.e., forwarded out of the output port 40 of switch A) can come from one or more sources and can reach switch A over one or more input links 41.

The data packets that exit the virtual pipe 25 (i.e., forwarded out of the output port 40 of switch D) can be forwarded over plurality of output links 41 to one of plurality of destinations.

The data packets that exit the virtual pipe 25 (i.e., forwarded out of the output port 40 of switch D) can be forwarded simultaneously to multiple destinations, (i.e., multicast (one-to-many) data packet forwarding).

The communication link 41 between two adjacent ones of the switches 10 can be used simultaneously by at least two of the virtual pipes. In FIG. 2, where there are three virtual pipes:

The three virtual pipes can multiplex (i.e., mix their traffic) over the same communication links.

The three virtual pipes can multiplex (i.e., mix their traffic) during the same time frames and in an arbitrary manner.

The same time frame can be used by multiple data packets from one or more virtual pipes.

Virtual Pipe Capacity Assignment:

For each virtual pipe there are predefined time frames within which respective data packets are transferred into its respective switches, and separate predefined time frames within which the respective data packets are transferred out of its respective switches. Though the time frames of each virtual pipe on each of its switches can be assigned in an arbitrary manner along the common time reference, it is convenient and practical to assign time frames in a periodic manner in time cycles and super cycles.

Figure 8:
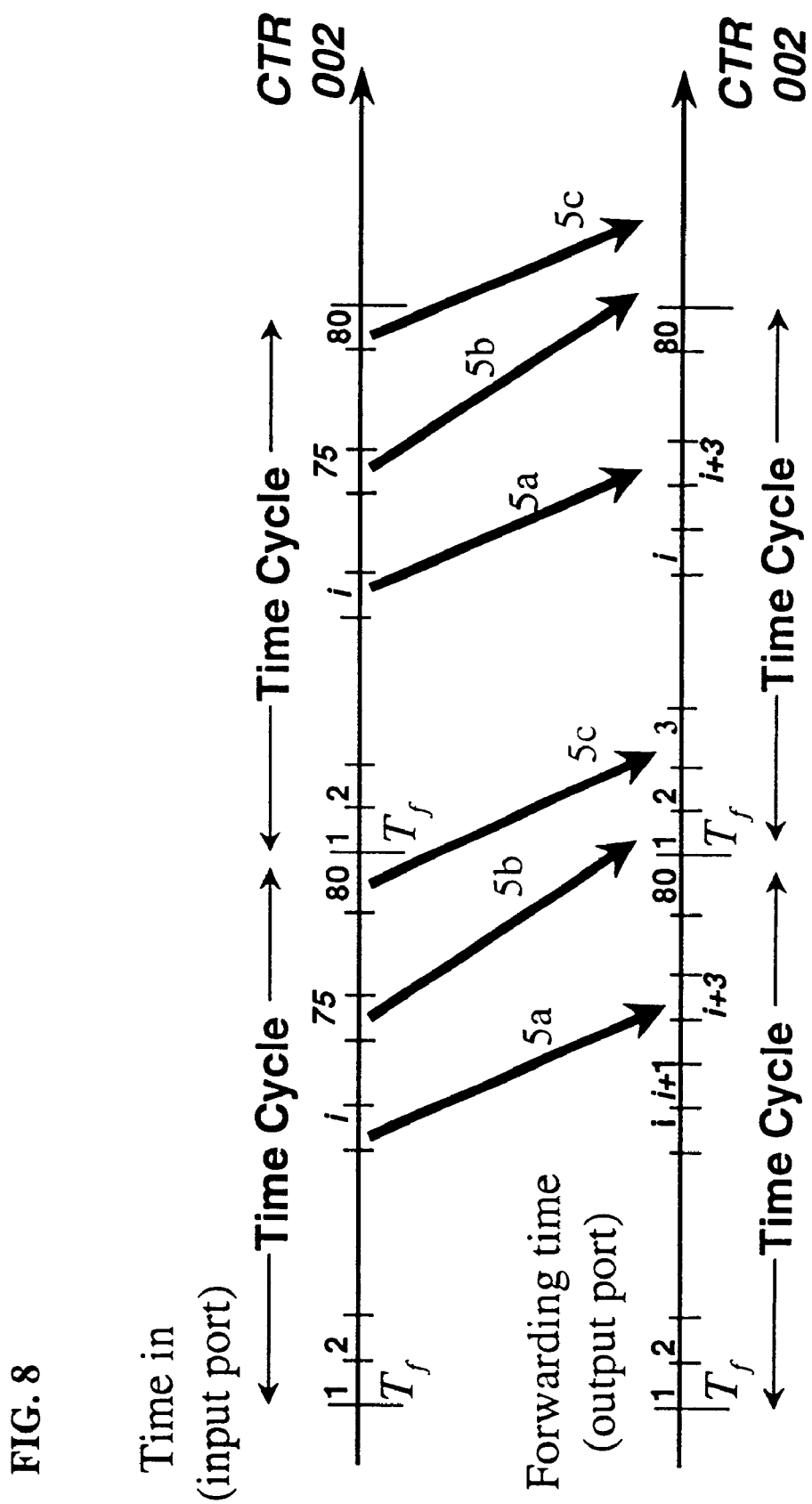
FIG. 8 illustrates the mapping of the time frames into and out of a node on a virtual pipe, wherein the mapping repeats itself in every time cycle illustrating time in versus forwarding time out.

FIG. 8 illustrates the timing of a switch of a virtual pipe wherein there are a predefined subset of time frames (i, 75, and 80) of every time cycle, during which data packets are transferred into that switch, and wherein for that virtual pipe there are a predefined subset time frames (i+3, 1, and 3) of every time cycle, during which the data packets are transferred out of that switch. If each of the three data packets has 125 bytes or 1000 bits, and there are 80 time frames of 125 microseconds in each time cycle (i.e., time cycle duration of 10 $\mu$sec), then the bandwidth allocated to this virtual pipe is 300,000 bits per second.

In general, the bandwidth or capacity allocated for a virtual pipe is computed by dividing the number of bits transferred during each of the time cycles by the time cycle duration. In the case of a super cycle, the bandwidth allocated to a virtual pipe is computed by dividing the number of bits transferred during each of the super cycles by the super cycle duration.

The switch 10 structure, as shown in FIG. 3, can also be referred to as a pipeline switch, since it enables a network comprised of such switches to operate as a large distributed pipeline architecture, as it is commonly found inside digital systems and computer architectures.

Figure 9:
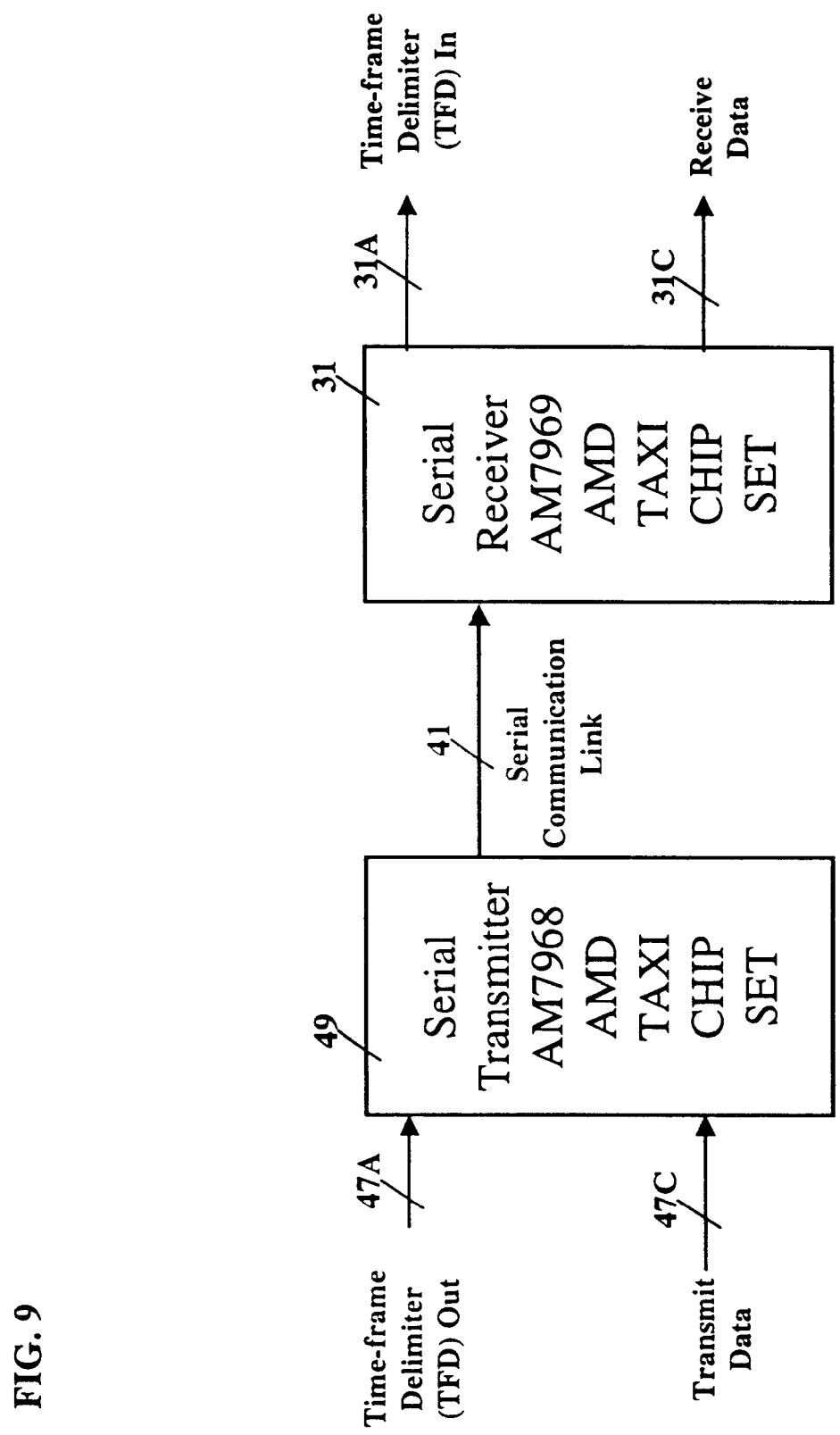
FIG. 9 is an illustration of a serial transmitter and a serial receiver.
Figure 12:
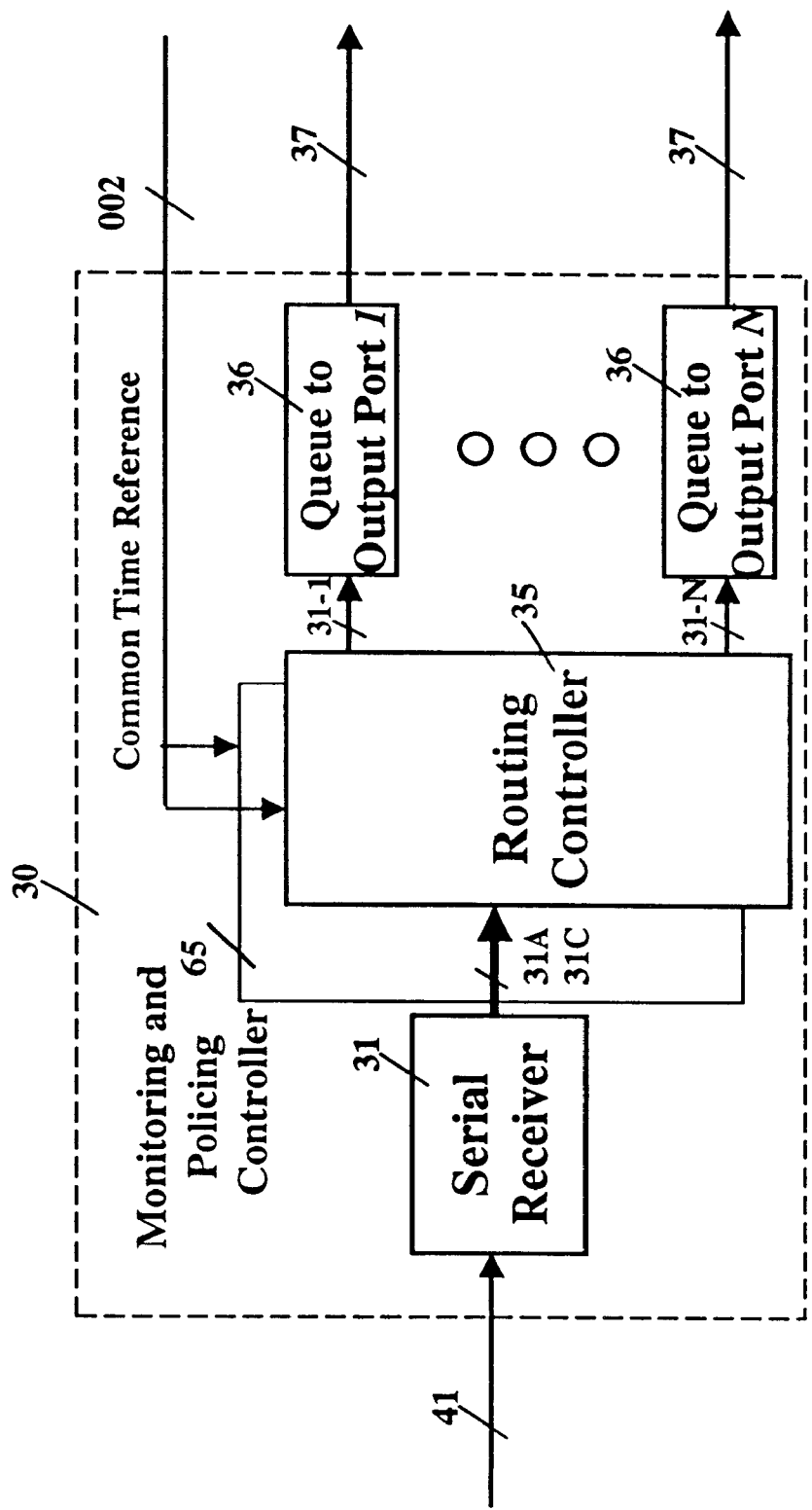
FIG. 12 is a schematic block diagram of an input port with a routing controller.
Figure 16:
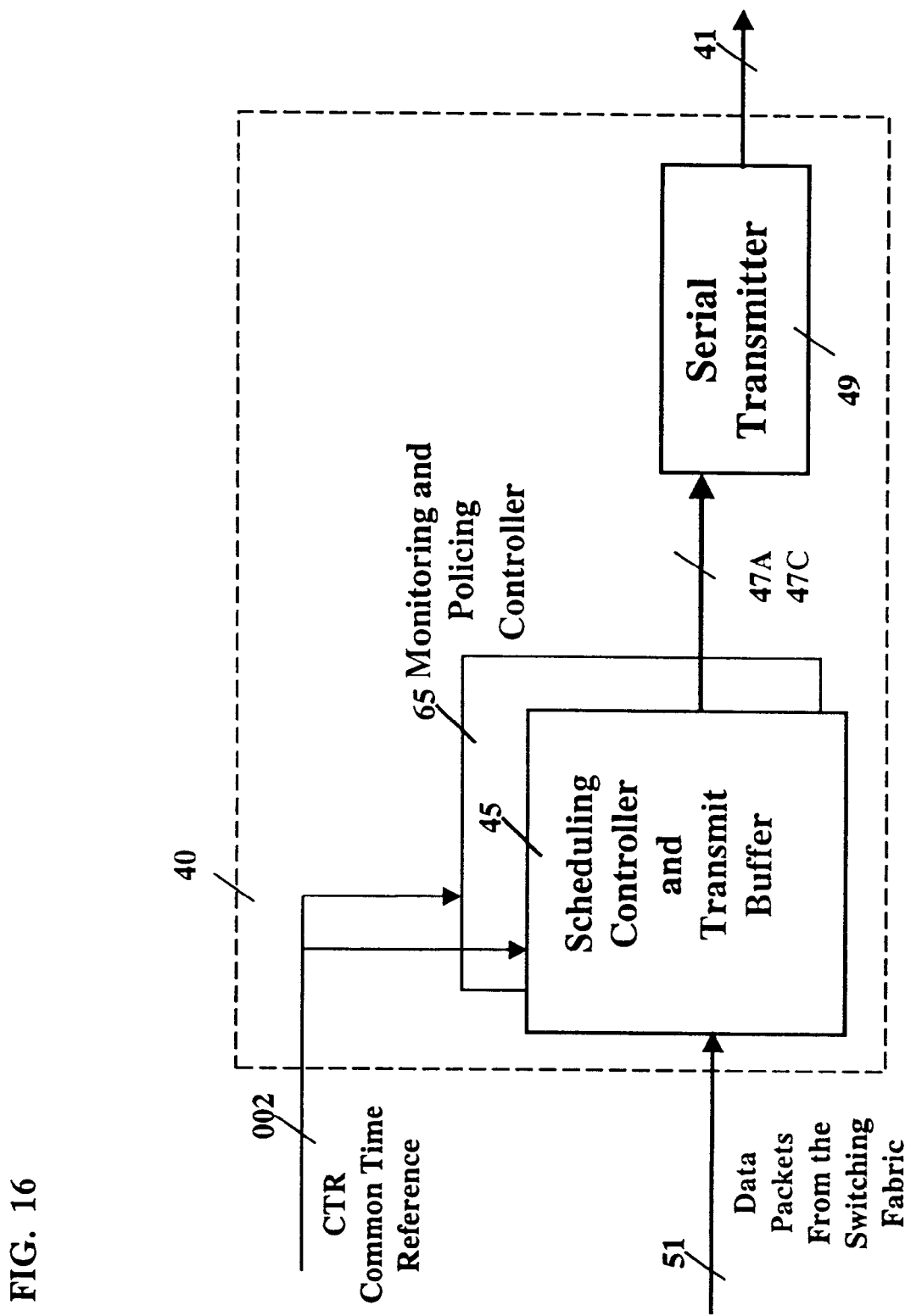
FIG. 16 is a schematic block diagram of an output port with a scheduling controller and a serial transmitter.

Each pipeline switch 10 is comprised of a plurality of addressable input ports 30 and output ports 40. As illustrated in FIG. 12, the input port 30 is further comprised of a routing controller 35 for mapping each of the data packets that arrives at each one of the input ports to a respective one of the output ports. As illustrated in FIG. 16, the output port 40 is further comprised of a scheduling controller and transmit buffer 45. An output port 40 is connected to an input port 30 via a communication link 41, as shown in FIG. 9. The communication link can be realized using various technologies compatible with the present invention.

As shown in FIG. 3, the common time reference 002 is provided to the input ports 30 and output ports 40 from the GPS time receiver 20, which receives its timing signal from the GPS antenna 001. GPS time receivers are available from variety of manufacturers, such as, TrueTime, Inc. (Santa Rosa, Calif.). With such equipment, it is possible to maintain a local clock with accuracy of ±1 microsecond from the UTC (Coordinated Universal Time) standard everywhere around the globe.

The Communication Link and Time Frame Delimiter Encoding:

The communication links 41 used for the system disclosed is in this invention can be of various types: fiber optic, wireless, etc. The wireless links can be between at least one of a ground station and a satellite, between two satellites orbiting the earth, or between two ground stations, as examples.

Referring to FIG. 9, a serial transmitter 49 and serial receiver 31 are illustrated as coupled to each link 41. A variety of encoding schemes can be used for a serial line link 41 in the context of this invention, such as, SONET/8DH, 8B/10B Fiber Channel, 4B/5B FDDI. In addition to the encoding and decoding of the data transmitted over the serial link, the serial transmitter/receiver (49/31) sends/receives control words for a variety of control purposes, mostly unrelated to the present invention description. However, one control word, time frame delimiter (IFD), is used in accordance with the present invention. The TFD marks the boundary between two successive time frames and is sent by a serial transmitter 49 when a CTR 002 clock tick occurs in a way that is described hereafter as part of the output port operation. It is necessary to distinguish in an unambiguous manner between the data words, which carry the information, and the control signal or words (e.g., the TbF) is a control signal) over the serial link 41. There are many ways to do this. One way is to use the known 4B/5B encoding scheme (used FDDI). In this scheme, every 8-bit character is divided into two 4-bit parts and then each part is encoded into a 5-bit codeword that is transmitted over the serial link 41.

FIG. 10 illustrates an encoding table from 4-bit data to 5-bit serial codewords. The 4B/5B is a redundant encoding scheme, which means that there are more codewords than data words. Consequently, some of the unused or redundant serial codewords can be used to convey control information.

FIG. 11 is a table with 15 possible encoded control codewords, which can be used for transferring the time frame delimiter (TFD) over the serial link. The TFD transfer is completely transparent to the data transfer, and therefore, it can be sent in the middle of the data packet transmission in a non-destructive manner.

When the communication links 41 are SONET/SDH, the time frame delimiter cannot be embedded as redundant serial codewords, since SONET/SDH serial encoding is based on scrambling with no redundancy. Consequently, the TFD) is implemented using the SONET/SDH frame control fields: transport overhead (TOH) and path overhead (POH). Note that although SONET/SDH uses a 125 microseconds frame, it cannot be used directly in accordance with the present invention, at the moment, since SONET/SDH frames are not globally aligned and are also not aligned to UTC. However, if SONET/SDH frames are globally aligned, SONET/SDH can be used compatibly with the present invention.

The Input Port and the Monitoring and Policing Controllers:

As shown in FIG. 12, the input port 30 has four parts: serial receiver 31, a routing controller 35, separate queues to the output ports 36, and the monitoring and policing controllers 65 that will be described after the description of the output port. The serial receiver 31 transfers the data packets and the time frame delimiters to the routing controller 35.

The routing controller 35 is constructed of a central processing unit (CPU), a random access memory (RAM) for storing the data packet, read only memory (ROM) for storing the routing controller processing program and the routing table that is used for determining the output port that the incoming data packet should be switched to.

Figure 13:
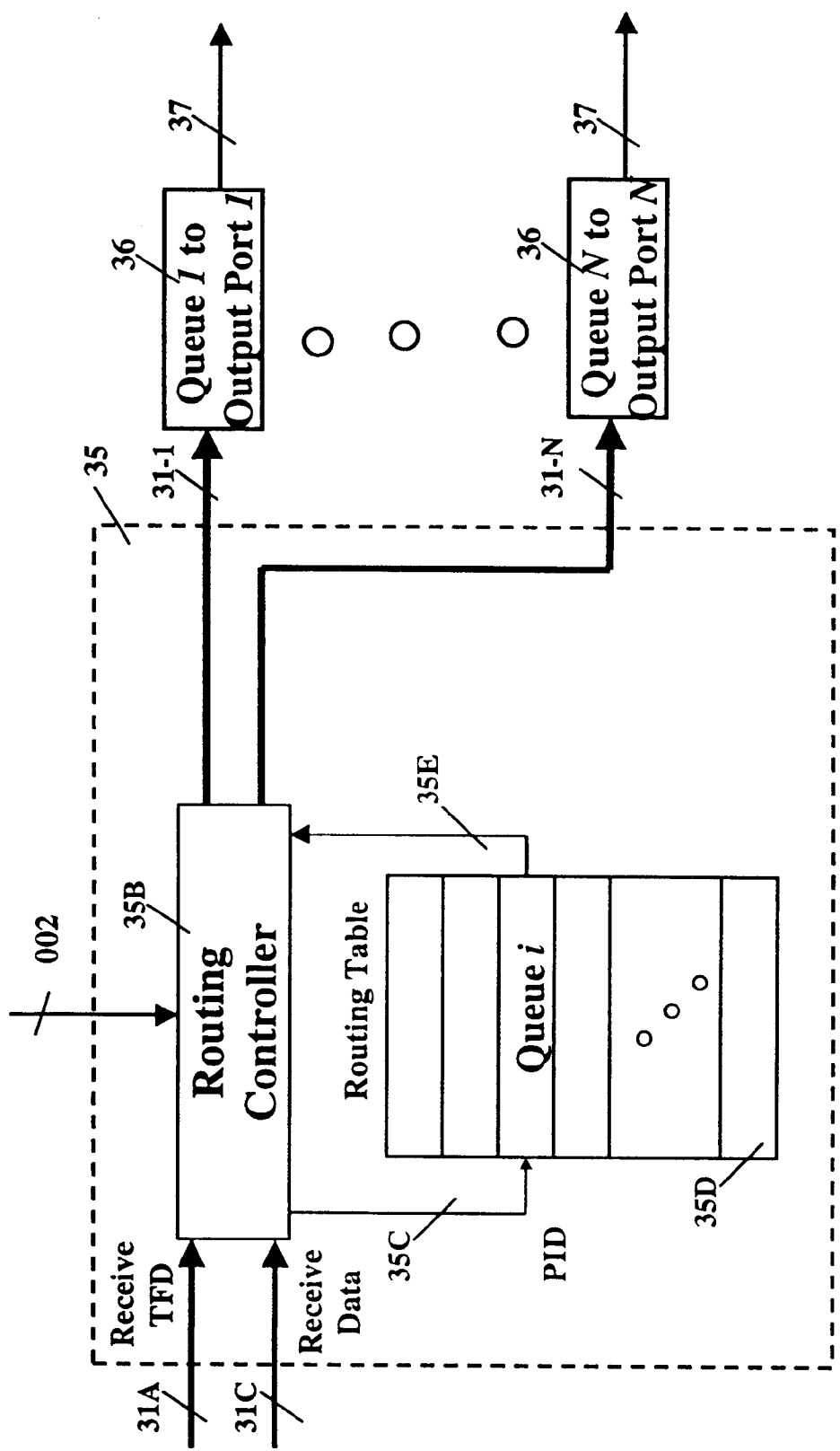
FIG. 13 is a schematic diagram of the routing controller which determines to which output port an incoming data packet should be switched to and attaches the time of arrival (TOA) information to the data packet header.
Figures 15A, 15B:
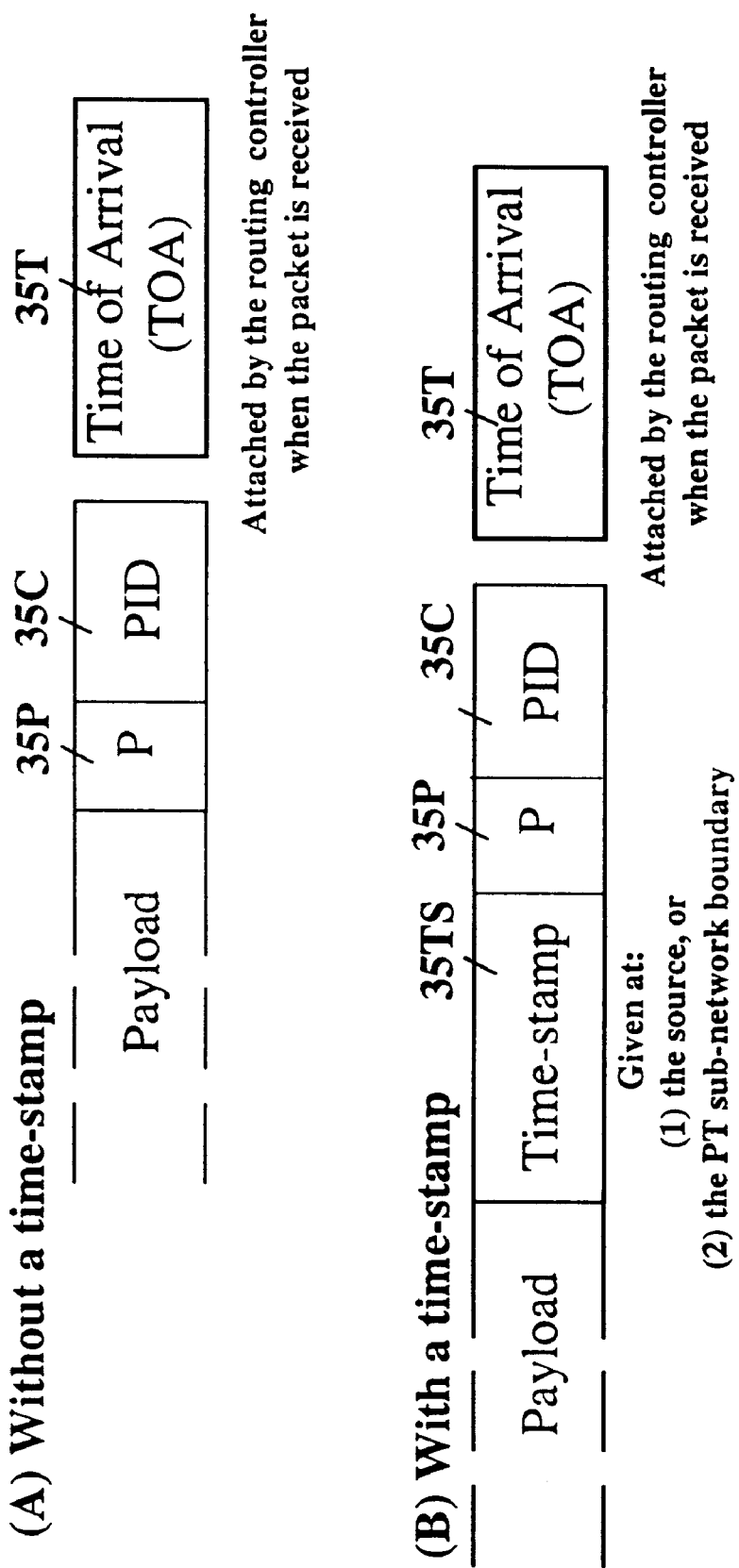

As illustrated in FIG. 13, the incoming data packet header includes a virtual pipe identification, PID (35C), that is used to lookup in the routing table 35D the address 35E of the queue 36 that the incoming data packet should be transferred into. Before the packet is transferred into its queue 36, the time of arrival (TOA) 35T is attached to the packet header as illustrated in FIGS. 15A and 15B. The TOA 35T is used by the scheduling controller 45 of the output port 40 in the computation of the forwarding time out of the output port, and shown in FIG. 16.

The data packet can have various formats, such as, Internet protocol version 4 (IPv4), Internet protocol version 6 (IPv6), asynchronous transfer mode (ATM) cells, etc.

The data packets PID can be determined by one of the following: an Internet protocol (IP) address, an asynchronous transfer mode (ATM) a virtual circuit identifier, a virtual path identifier (VCI/VPI), Internet protocol version 6 (IPv6) addresses, Internet MPLS (multi protocol label swapping or tag switching) labels, and IEEE 802 MAC (media access control) address, etc.

Figure 14:
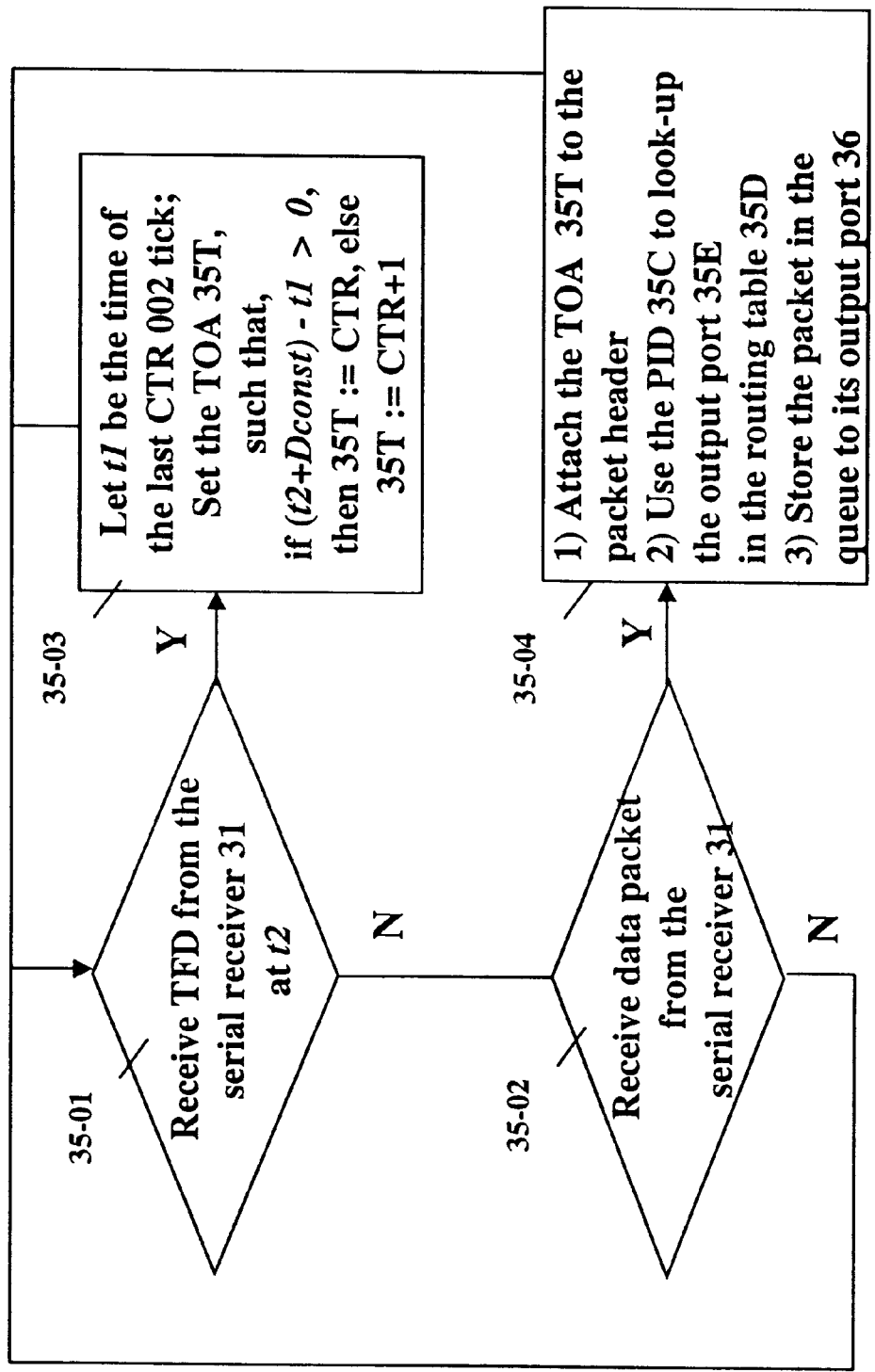
FIG. 14 illustrates the routing controller operation.

FIG. 14 illustrates the flow chart for the router controller 35 processing program executed by the routing controller 35B. The program is responsive to two basic events from the serial receiver 31 of FIG. 12: the receive time frame delimiter LFD at step 35-01, and the receive data packet at step 35-02. After receiving a TFD, the routing controller 35 computes the time of arrival (TOA) 35T value at step 35-03 that is attached to the incoming data packets. For this computation it uses a constant, Dconst, which is the time difference between the common time reference (CIR) 002 tick and the reception of the IFD) at time t2 (generated on an adjacent switch by the CTR 002 on that node). This time difference is caused by the fact that the delay from the serial transmitter 49 to the serial receiver 31 is not an integer number of time frames. When the data packet is received at step 35-02, the routing controller 35B executes three operations as set forth in step 35-04: attach the TOA, lookup the address of the queue 36 using the PID, and storing the data packet in that queue 36.

The Switching Fabric:

There are various ways to implement a switching fabric. However, the switching fabric is peripheral to the present invention, and so it will be described only briefly. The main property that the switching fabric should ensure is that packets for which the priority bit P (35P in FIGS. 15A and 15B) is set to high priority (i.e., reserved traffic) will be switched into the output port in a constant bounded delay—measured in time frames.

This is possible in accordance with the present invention, where the packets in the input ports are already separated into queues to their respective output ports. Then, by using the Clos theorem in the time domain (see J. Y. Hui "Switching and Traffic Theory for Integrated Broadband Networks", page 65), the delay can be bounded by two time frames —one time frame at the input port and one time frame to get across the switching fabric. Other implementations can be used, such as based on shared bus with round robin service of the high priority data packets, or on a crossbar switch.

Another possible switch design is shared memory, which ensures a deterministic delay bound from an input port to an output port Shared memory packet switches are commercially available from various vendors, for example, MMC Networks Inc. (Santa Clara, Calif.).

FIGS. 15A and 15B illustrate data packets without and with a time stamp attached, respectively.

The Output Port and the Monitoring and Policing Controllers

The output port 40 is illustrated in FIG. 16, comprised of a scheduling controller with a transmit buffer 45, serial transmitter 49 (as previously described herein), and the monitoring and policing controllers. The scheduling controller 45 performs a mapping of each of the data packets between the associated respective time of arrival (TOA) and an associated forwarding time out of the output port via the serial transmitter 49. The forwarding time is determined relative to the common time reference (CTR) 002.

Figure 17:
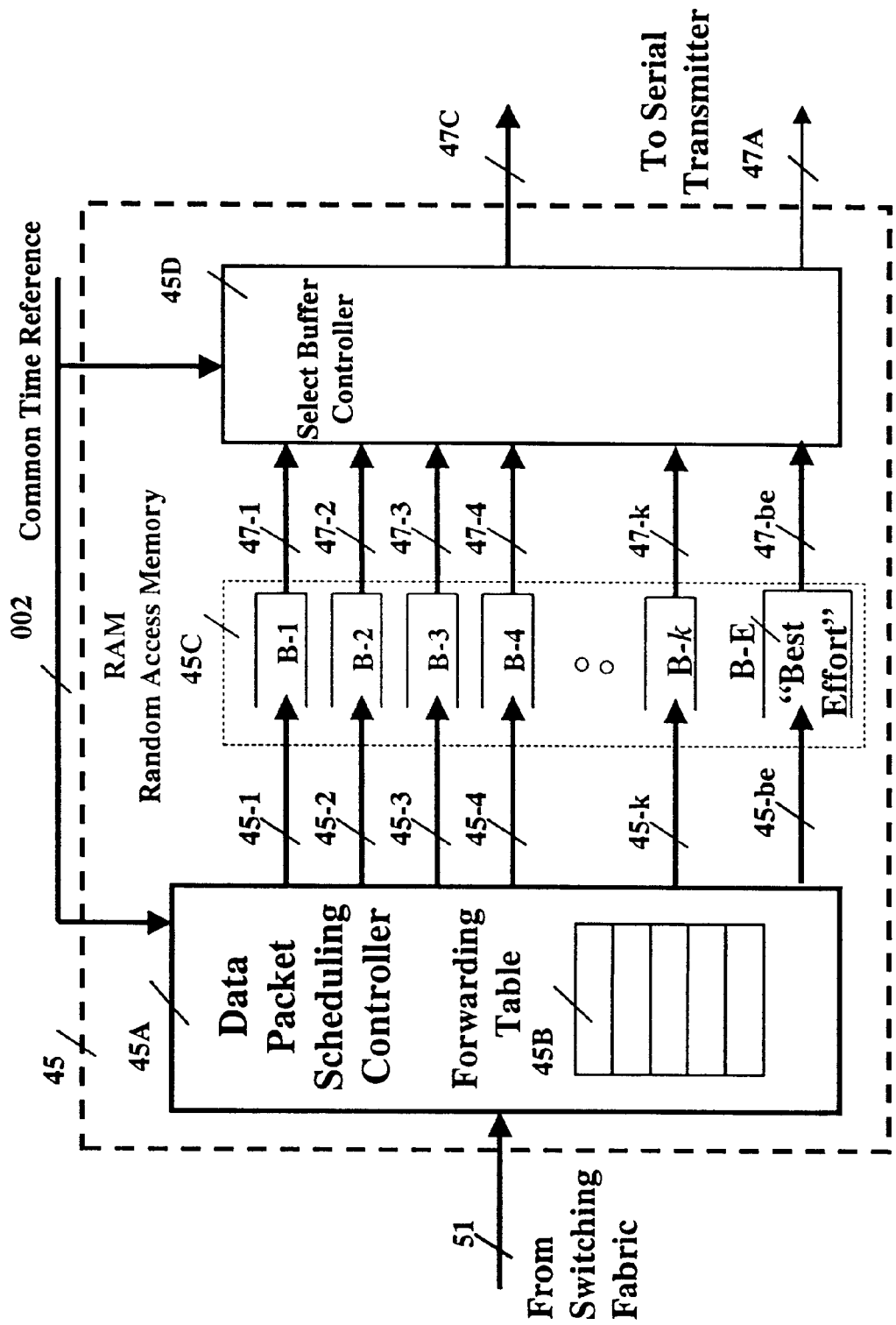
FIG. 17 is a functional block diagram of the general scheduling controller with its transmit buffer and select buffer controller.
Figure 18:
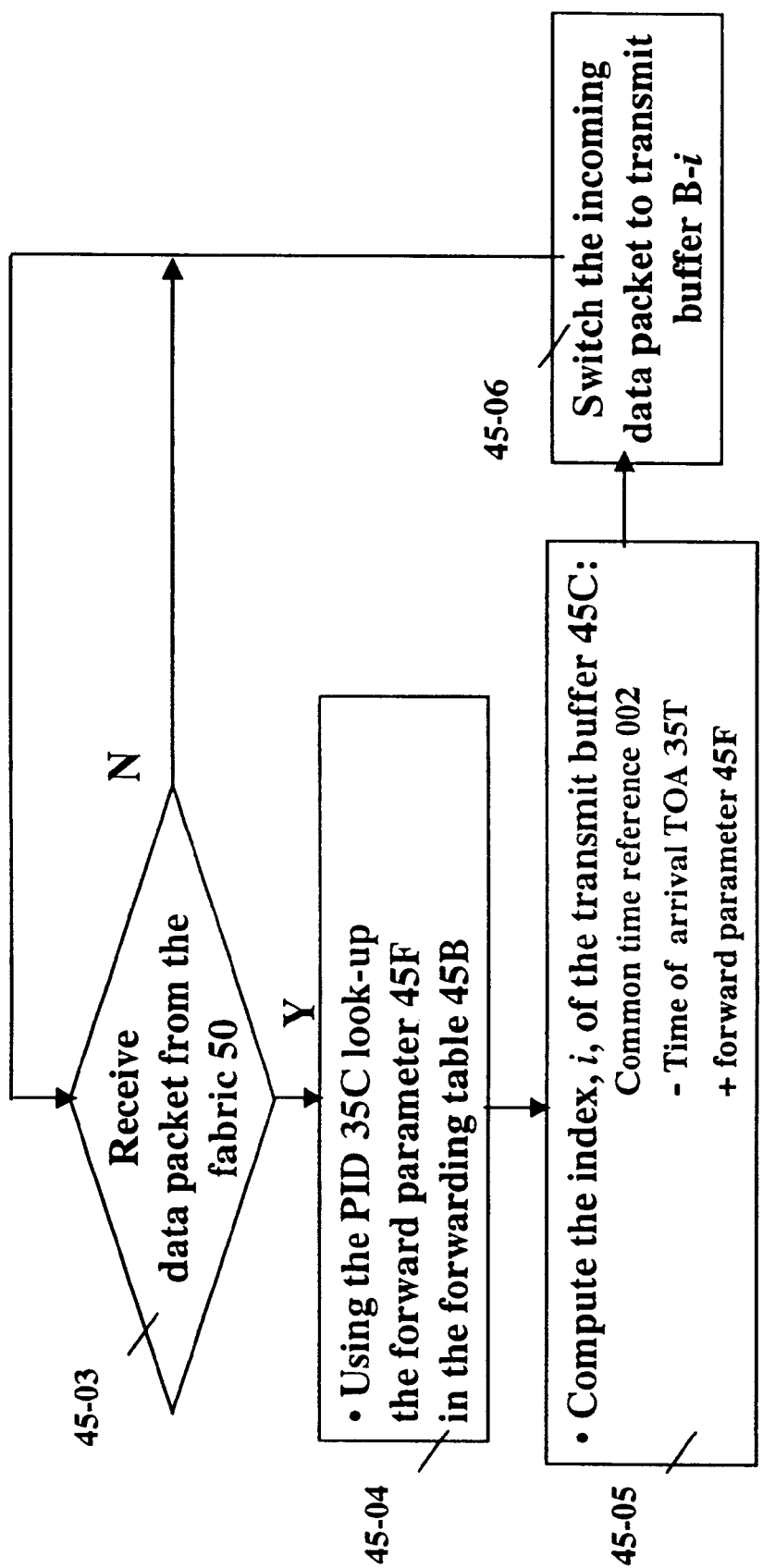
FIG. 18 is a flow diagram describing the packet scheduling controller operation for computing the forwarding time of a packet based on the following input parameters: PID 35C, TOA 35T and the CTR 002.
Figure 19:
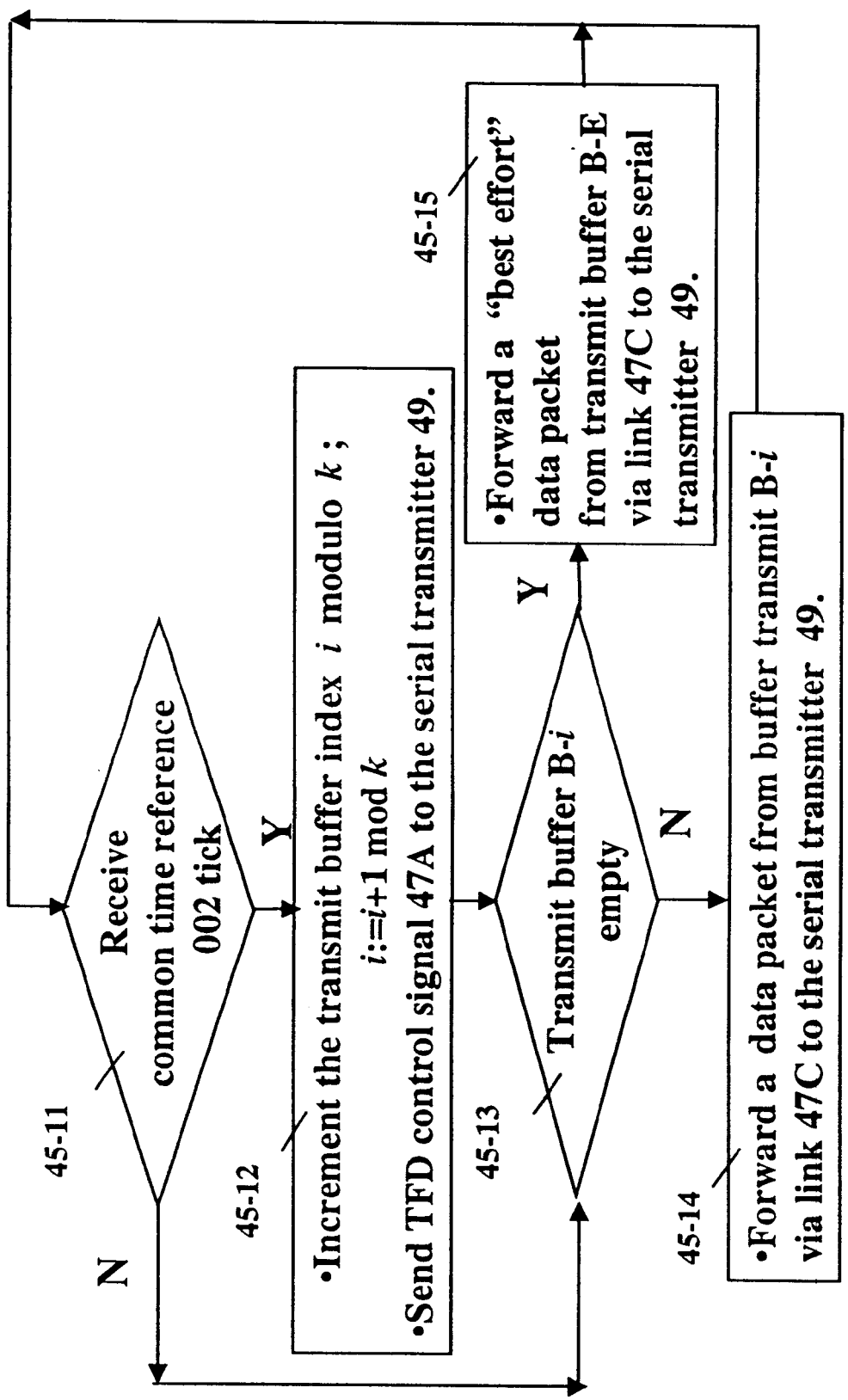
FIG. 19 is a flow diagram illustrating the operation of the Select Buffer Controller 45D.

A general scheduling controller 45 operation is described in FIGS. 17–19, which includes a transmit buffer 45C and a select buffer controller 45D. The data packet scheduling controller 45A, together with the select buffer controller 45D, perform the mapping, using the PID 35C and the data packet time of arrival (TOA) 35T in order to determine the respective time frame a respective packet should be forwarded out of the output port. Both controllers 45A and 45D are constructed of a central processing unit (CPU), a random access memory (RAM) for storing the data, and read only memory (ROM) for storing the controller processing program.

Data packets arrive from the switching fabric 50 via link 51. Data packets which have the priority bit 35P asserted (i.e., reserved traffic) are switched by the scheduling controller 45A to one of the k transmit buffers 45C (B-1, B-2, ...., B-k). Each of the k buffers is designated to store packets that will be forwarded in each of the k time frames in every time cycle, as shown in FIG. 5.

The flow chart for the program executed by the scheduling controller is illustrated in FIG. 18. When the data packet is received from the fabric at step 45-03, the PID 35C in the data packet header is used to look-up the forward parameter 45F in the forwarding table (45B of FIG. 17), as specified in step 45-04. Next, the index i of the transmit buffer, between B-1 and B-k, is computed in step 45-05 by subtracting the time of arrival TOA 35T from the common time reference CTR 002 and by adding the forward parameter 45F, and then switching the incoming data packet to transmit buffer B-i, as specified in step 45-06.

Incoming data packets in which the priority bit 35P is not asserted (i.e., non-reserved traffic) are switched by the scheduling controller to the transmit "best effort" buffer B-E via link 45-be.

FIG. 19 illustrates the flow chart for the select buffer controller 45D operation.

The controller 45D is responsive to the common time reference (CTR) tick 002, and at step 45-11, increments the transmit buffer index i (i.e., i:=i+1 mod k, where k is the time cycle size in time frames) and sends a time frame delimiter TFD to the serial transmitter at step 45-12. Then, if the transmit buffer B-i is not empty, at step 45-13, it will send a data packet from transmit buffer B-i, as specified in at step 45-14, else it will send a "best effort" data packet from the "best effort" buffer B-be, as specified at step 45-15. The monitoring and policing controllers:

The monitoring and policing controllers 65 FIGS. 20–23 are part of both the input port in FIG. 12 and the output port in FIG. 16. Monitoring and policing controllers 65 are of two basis types:

1. The delay monitoring controller 65D—for ensuring the correct tuning behavior by PID=p, FIGS. 20–21.
2. The policing and load controller 65P—for ensuring the correct capacity usage by PID=p, FIGS. 22–23.

Both controllers 65D and 65P are constructed of a central processing unit (CPU), a random access memory (RAM) for storing the data, and read only memory (ROM) for storing the controller processing program.

Figure 20:
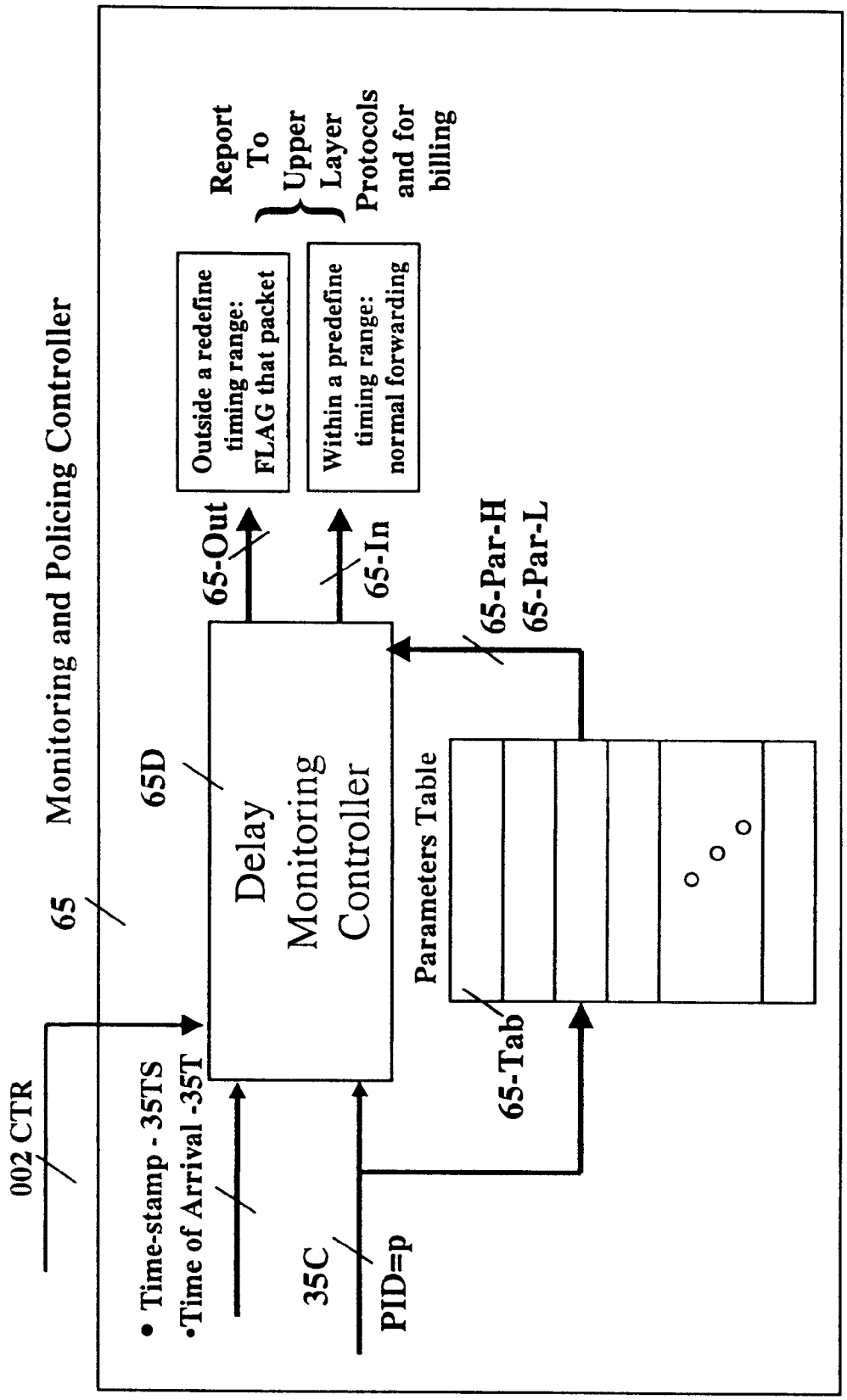
FIG. 20 is a schematic illustration of the delay monitoring controller.
Figure 21:
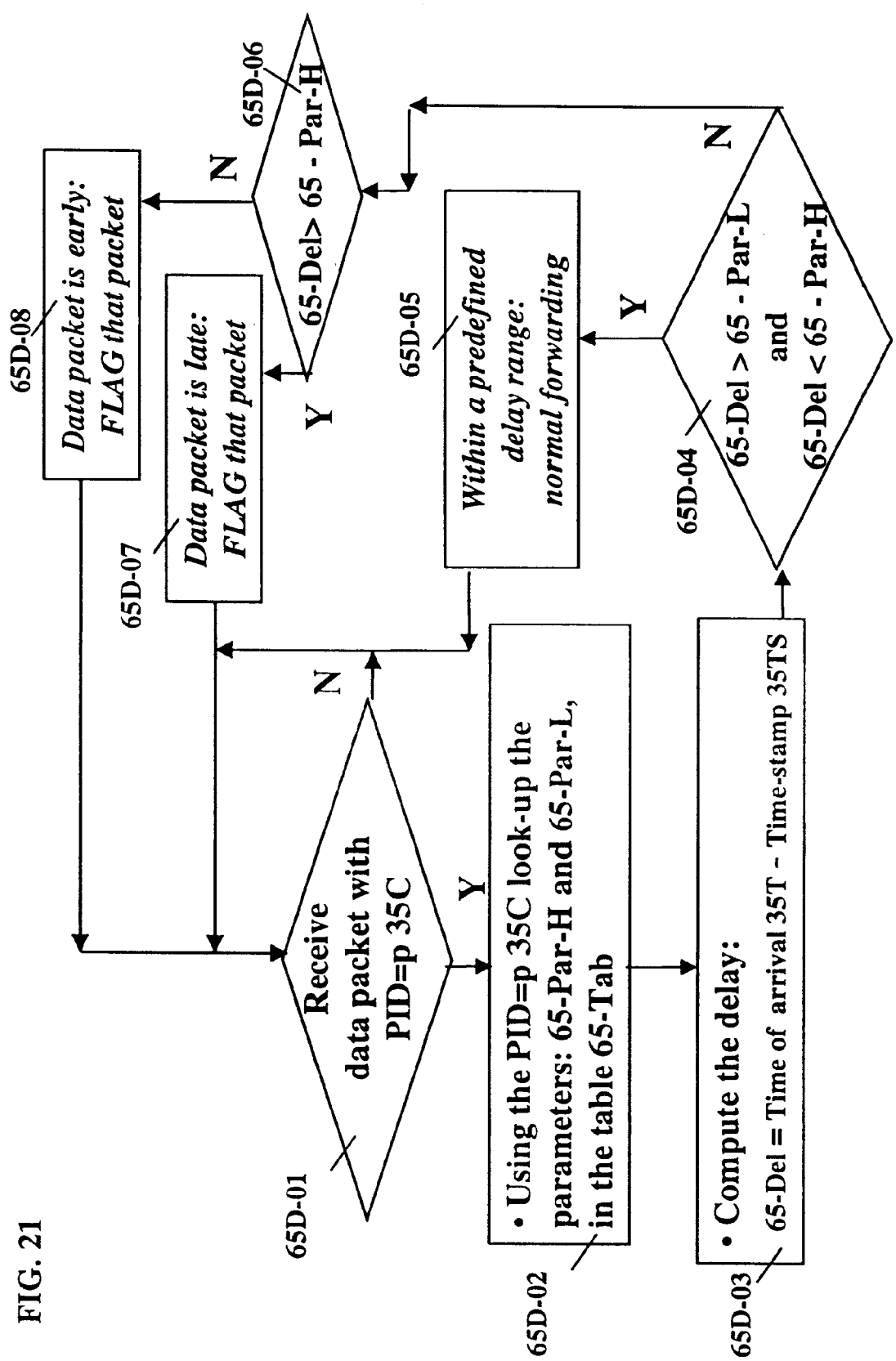
FIG. 21 is a flow chart of the program executed by the delay monitoring controller 65D.

The Delay Monitoring Controller 65D:

FIGS. 20–21 describe the operation of a delay monitoring controller 65D. This controller checks data packets in which their reserved priority bit, 35P in their headers, is asserted for three cases:

1. Data packet is within two predefined delay parameters range (see box 65D-05): between the two delay parameters: 65-par-L and 65-par-H, which were found PID=p 35C entry in the parameters table 65-Tab (see box 65D-02). More specifically, the delay monitoring controller 65D computes the actual delay the data packet already experienced: 65-Del=Time of arrival 35T–Time-stamp 35TS (see box 65D-03), then comparing that it is in the predefined delay range: (65-Del>65-Par-L and 65-Del<65-Par-H) (see box 65D-04).

2. Data packet is late (see box 65D-07): its delay is greater than 65-par-H, 65-Del>65-Par-H (see box 65D-06), and 3. Data packet is early (see box 65D-08): its delay is smaller than 65-par-L, 65-Del<65 - Par-L.

The three cases have importance on ensuring proper network operations and the adherence to the user quality of service (QoS) requirements. Furthermore, the information collected by the delay monitoring controller is reported to upper layer protocols, which are outside the scope of this invention.

Figure 22:
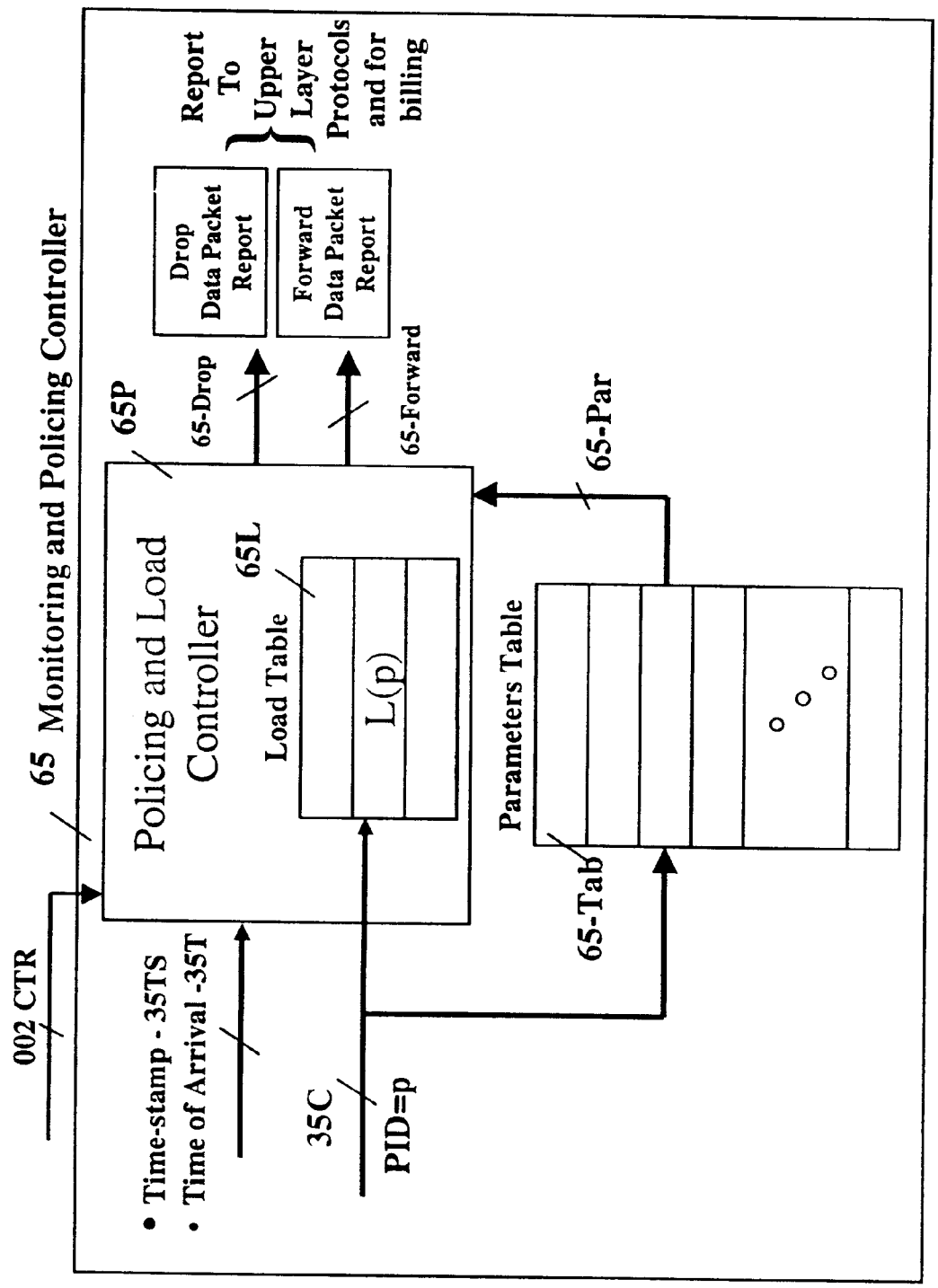
FIG. 22 is a schematic illustration of the policing and load controller.
Figure 23:
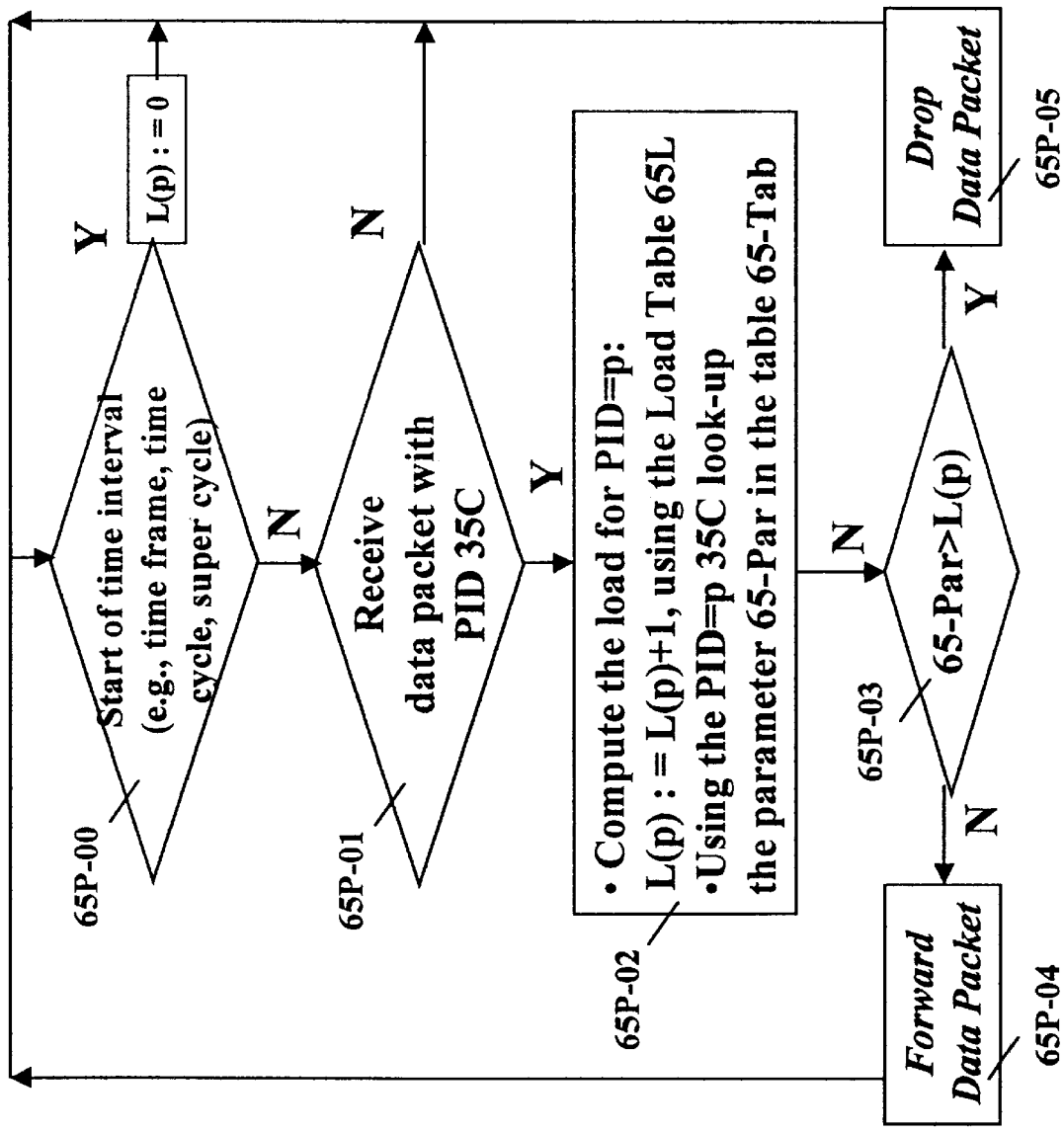
FIG. 23 is a flow chart of the program executed by the policing and load controller 65P.

The Policing and Load Controller 65P:

FIGS. 22–23 describe the operation of a policing and load controller 65P that checks and ensures that a data packets in which its reserved priority bit 35P (in its header) is asserted will not exceed the predefined load of its virtual pipe—PID=p. This controller operation can be used for both:

1. Policing—detecting PID=p that exceeds its reserved capacity, and

2. Billing—recording the actual capacity usage of PID=p.

The two cases have importance on ensuring proper network operations and the adherence to the user quality of service (QoS) requirements.

When a data packet is received (see box 65P-01) the policing an load controller 65P first computes the current load, L(p) for PID=p (see box 65P-02) by L(p :=L(p)+1 (see box 65P-02) using the load table 65L that stores previous values of L(p). The load can be computed in various ways: (i) per time frame of PID=p, (ii) per time cycle of PID=p, or (iii) per super cycle of PID=p.

Next the policing and load controller 65P using the PID=p 35C look-up the parameter 65-Par in the table 65-Tab. Then if 65-Par>L(p) (see box 65P-03) the data packet is dropped (see box 65P-05), otherwise the data packet is forwarded (see box 65P-04).

In the above two cases the load L(p) information on PID=p is recorded and reported to upper layer protocols for billing the usage for the usage of PID=p. Furthermore, the policing and load information is used also for ensuring proper network operations and the adherence to the user quality of service (QoS) requirements. The information collected by the policing and load controller is reported to upper layer protocols, which are outside the scope of this invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A communications system comprising:
    a plurality of switches with plurality of uniquely addressable input and output ports coupled via a plurality of communication links, wherein data packets flow over said communication links during a plurality of predefined time intervals;
    a common time reference signal (CTR) coupled to each of the switches;
    a pipe identification (PID) for each of a plurality of predefined subsets of the data packets;
    a parameter table in each of the switches, wherein for each PID there is a predefined set of values, wherein each value from the predefined set of values specifies a reserved number of data packets that can be forwarded from said switch output port in each of the predefined time intervals responsive to the CTR signal;
    a policing and load controller for counting and comparing the number of data packets with the same subset PID in each of said predefined time intervals and storing a count value in a load value table, and providing an output responsive comparing the count value in the load table with the respective parameter table values, responsive to the PID and responsive to the CTR signal.

2. The system as in claim 1, wherein the policing and load controller determines the number of data packets with the same subset PID to be one of within a predefined range and outside the predefined range.

3. The system as in claim 2, wherein if the number of data packets with the same subset PID is outside the predefined range a violation message is generated and output.

4. The system as in claim 2, wherein if the number of data packets with the same subset PID is outside the predefined range during the predefined time interval, said respective data packets are discarded.

5. The system as in claim 1, wherein each of the predefined time intervals is comprised of a plurality of predefined time frames.

6. The system as in claim 5, wherein a fixed number of contiguous time frames comprising a time cycle.

7. The system as in claim 6, wherein the time cycles are contiguous.

8. The system as in claim 7, wherein a fixed number of a plurality of contiguous ones of the time cycles comprise a super cycle;
    wherein the super cycle is periodic.

9. The system as in claim 1, wherein the common time reference signal coupled to each of the switches comes from a GPS (Global Positioning System).

10. The system as in claim 1, wherein the common time reference signal coupled to each of the switches conforms to the UTC (Coordinated Universal Time) standard.

11. The system as in claim 10, wherein the super cycle duration is equal to one second as measured using the UTC (Coordinated Universal Time) standard.

12. The system as in claim 10, wherein the super cycle duration is equal to a predefined number of seconds as measured using the UTC (Coordinated Universal Time) standard.

13. The system as in claim 10, wherein the super cycle duration is equal to a predefined fraction of a second measured using the UTC (Coordinated Universal Time) standard.

14. The system as in claim 1, wherein the parameter table values are predefined to correspond to the time frames.

15. The system as in claim 1, wherein the policing and load controller is located in at least one of the input port of the switch and the output port of the switch.

16. The system as in claim 1, wherein the plurality of switches comprises a plurality of virtual pipes, each comprised of at least two interconnected switches, wherein the data packets forwarded over the same virtual pipe each have the same pipe identification (PID).

17. The system as in claim 16, wherein the PID is at least one of an Internet protocol (IP) address, Internet protocol port number, Internet protocol group multicast address, an asynchronous transfer mode (ATM), a vial circuit identifier (VCI), a virtual path identifier (VPI), used in combination as VCI/VPI, and a combined IP address and IP port number.

18. The system as in claim 17, wherein one PID is associated with a plurality of said IP and ATM addresses, and ID port numbers.

19. The system as in claim 3, further comprising a predefined network violation center that is part of the upper layer protocols, wherein the violation message is output to the violation center.

20. The system as in claim 14, wherein the parameter table values apply equivalently to any of the time cycles.

21. A communications system comprising:
a plurality of switches with plurality of uniquely addressable input and output ports coupled via a plurality of communication links. wherein data packets flow over said communication links during a plurality of predefined time intervals, wherein a time-stamp is associated with each said packet representing an initial time of input of the respective data packet into the system;
a common time reference (CTR) signal coupled to each of the switches;
a pipe identification (PID) for each of a predefined subset of the data packets to be transferred during the predefined time intervals responsive to the CTR signal;
a parameter table associated with at least one of the switches, wherein each of the PIDs is associated with a predefined set of values specifying a delay range for data packets with the same PID; and
a delay monitoring controller for computing the delay in the transfer of a respective one of the data packets that has elapsed since the initial time responsive to the CTR signal.

22. The system as in claim 21, wherein the parameter table defines the maximum delay and minimum delay values for at least one of the PIDs.

23. The system as in claim 22, wherein respective ones of the data packets are flagged as one of the delay above the maximum delay value, and the delay below the minimum delay value.

24. The system as in claim 23, wherein the respective ones of data packets are discarded responsive to the delay being above the maximum delay value, and the delay being below the minimum delay value, and wherein violation messages are generated and output.

25. The system as in claim 24, wherein the violation messages are output to a predefined network violation center that is part of upper layer protocols.

26. The system as in claim 21, wherein the said delay monitoring controller is located at the input port of at least one of said switches.

27. The system as in claim 21, wherein the delay monitoring controller is located at the output port at least one of said switches.

28. The system as in claim 21, wherein the initial time is defined as the time the data packet is sent by its source to the system.

29. The system as in claim 21, wherein said initial time is defined as the time the data packet is forwarded by a predefined one of the switches in said system.

30. The system as in claim 21, wherein the delay in transferring the packet is computed by finding a time difference between the time-stamp and the current time derived from the common time reference.

31. The system as in claim 30, wherein the time-stamp is generated by an Internet real-time protocol (RTP).

32. The system as in claim 31, wherein the time-stamp is generated by a predefined one of the switches.

33. The system as in claim 31, wherein each of the data packets is originated from a source node, wherein the time-stamp is generated at the respective source node for inclusion in the respective originated data packet.

34. The system as in claim 21, where a predefined plurality of the time intervals define a time cycle, and wherein a predefined plurality of the time cycles define a super cycle, wherein the values stored in the parameter table correspond to the same respective time frames for all the time cycles and for all the super cycles.

35. A system for transferring data packets from at least one source to at least one destination, wherein the transfer of the data packets is provided during respective ones of a plurality of predefined time intervals, wherein each of the predefined time intervals is comprised of a plurality of predefined time frames, said system comprising:
a virtual pipe comprising at least two switches interconnected via communication links in a path;
a common time reference (CTR) signal coupled to each of the switches;
a time-stamp associated with at least one of said data packet representing initial predefined time and is generated responsive to the CTR signal;
wherein for each switch there is a first predefined time-frame within which a respective data packet is transferred into the respective switch, and a second predefined time-frame, responsive to the CTR signal, within which the respective data packet is transferred out of the respective switch; and
a delay monitoring controller for computing the delay in transfer of the data packets that has elapsed since the initial predefined time responsive to the CTR signal.

36. The system as in claim 35, wherein for at least one of the switches there is an associated load table for storing a count of the number of respective ones of the data packets that have been transferred, and a parameter table storing predefined values for a range of a number of data packets that can be forwarded for each of the respective virtual pipes during each of the respective time frames.

37. The system as in claim 35, wherein for each switch there is a parameter table with a predefined values defining an acceptable range of delay that a data packet can experience in transferring relative to its predefined initial time.

38. The system as in claim 35, wherein there is a predefined time difference between the time frame associated with the transfer for each respective one of the packets, responsive to the time frame that the respective packet goes into the respective switch and the time frame that the respective packet goes out of the respective switch.

39. The system as in claim 35, wherein there are a plurality of the virtual pipes.

40. The system as in claim 38, wherein the predefined time difference is constant for all the switches.

41. The system as in claim 38, wherein the predefined time difference is variable for at least some of the switches.

42. The system as in claim 35, wherein said delay monitoring controller measures the delay in transfer of the respective data packets across said virtal pipe.

43. The system as in claim 35, wherein said monitor delay controller flags said data packet when said delay across the respective virtual pipe is greater than a predefined threshold.

44. The system as in claim 35, wherein said monitor delay controller flags said data packet, when said delay across the respective virtual pipe is smaller than a predefined threshold.

45. The system as in claim 35, wherein a violation flag is asserted when the number of data packets transferred within a respective one of said virtual pipes within said time interval exceeds a predefined threshold.

46. The system as in claim 35, wherein a violation flag is asserted responsive to the number of data packets transferred within a respective one of said virtual pipes within said respective time interval is below a predefined low threshold.

47. A communications system comprising:
a plurality of switches, each with a plurality of uniquely addressable input and output ports, coupled via a plurality of communication links, wherein data packets flow over said communication links during a plurality of predefined time intervals;
a common time reference signal (CTR) coupled to each of the switches;
a pipe identification (PID) associated with each of a predefined subset of the data packets;
a parameter table associated with each of the switches, wherein for at least some of the PIDs there is a predefined set of values specifying a reserved number of data packets that can be forwarded from said switch output port in each of the predefined time intervals;
a load table for storing a count value;
a policing and load controller for counting the number of data packets with the same subset PID transferred during the respective predefined time interval and comparing said counted number with a respective one of the predefined set of values in the parameter table;
a time-stamp associated with at least one of said data packets representative of a predefined initial time;
a virtual pipe comprising at least two of the switches interconnected via communication links in a path;
wherein each said virtual pipe has at least one associated PID;
wherein for each switch there is a predefined time interval within which a respective data packet is transferred into the respective switch, and a separate predefined time interval within which the respective data packet is transferred out of the respective switch; and
a delay monitoring controller for computing the delay in transferring the respective data packets that has elapsed since the predefined initial time responsive to the CTR signal.

48. The system as in claim 47, wherein the number of the respective data packets forwarded on said respective virtual pipe within a predefined delay range is reported to a billing center that is part of upper layer protocols, responsive to the policing and load controller.

49. A communications method for use with a plurality of switches each with a plurality of uniquely addressable input and output ports coupled via a plurality of communication links, wherein data packets flow over said communication links during a plurality of predefined time intervals, said method comprising:
providing a common time reference signal (CTR) coupled to each of the switches;
associating a pipe identification (PID) with each of a plurality of predefined subsets of the data packets;
creating a parameter table in local storage in each of the switches, wherein for each PID there is a predefined set of values,
wherein each value from the predefined set of values specifies a reserved number of data packets that can be forwarded from said switch output port in each of the predefined time intervals responsive to the CTR signal;
counting and comparing the number of data packets with the same PID in each of said predefined time intervals;
storing a count value in a load value table; and
providing an output responsive to the comparing of the count value in the load table with the respective parameter table values, responsive to the PID and responsive to the CTR signal.

50. The method as in claim 49, wherein the parameter table values are predefined to correspond to respective ones of the time-frames.

51. The method as in claim 50, wherein the parameter table values apply equivalently to any of the time cycles.

52. A communications method for communication of data packets for use with a plurality of switches with plurality of uniquely addressable input and output ports coupled via a plurality of communication links, said method comprising:
coupling the data packets to flow over said communication links during a plurality of predefined time intervals;
associating a time-stamp with each said packet representing an initial time of input of the respective data packet into the system;
coupling a common time reference (CTR) signal to each of the switches;
associating a pipe identification (PID) for each of a predefined subset of the data packets to be transferred during the predefined time intervals responsive to the CTR signal;
creating a parameter table associated with at least one of the switches,
wherein each of the PIDs is associated with a predefined set of values specifying a delay range for data packets with the same PID; and
computing the delay in the transfer of a respective one of the data packets that has elapsed since the initial time responsive to the CTR signal.

53. A method for transferring data packets from at least one source to at least one destination, wherein the transfer of the data packets is provided during respective ones of a plurality of predefined time intervals, wherein each of the predefined time intervals is comprised of a plurality of predefined time-frames, said method comprising:
interconnecting at least two of the switches to create a virtual pipe via communication links in a path;
coupling a common time reference (CTR) signal to each of the switches;
associating a time-stamp with at least one of said data packets, wherein the time-stamp represents an initial predefined time and is generated responsive to the CTR signal;
transferring for each switch during a respective first predefined time-frame, a respective data packet into the respective switch responsive to the CTR signal;
transferring for each switch during a second respective predefined time-frame, the respective data packet out of the respective switch responsive to the CTR signal; and
computing the delay in transfer of the data packets that has elapsed since the initial predefined time responsive to the CTR signal.

* * * * *